US012549590B1

(12) United States Patent
Drew et al.

(10) Patent No.: US 12,549,590 B1
(45) Date of Patent: Feb. 10, 2026

(54) CPE PREDICTION USING BANNER-PROMPTED AI/ML MODELING

(71) Applicant: CrowdStrike, Inc., Sunnyvale, CA (US)

(72) Inventors: Shaefer Drew, Redmond, OR (US); Michael Avraham Brautbar, Groton, MA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 19/080,998

(22) Filed: Mar. 17, 2025

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01)

(58) Field of Classification Search
CPC ............................ H04L 63/1433; H04L 41/16
See application file for complete search history.

(56) References Cited

U.S. PATENT DOCUMENTS

| | | | | |
|---|---|---|---|---|
| 9,569,201 | B1 * | 2/2017 | Lotem | G06F 8/70 |
| 11,178,223 | B2 * | 11/2021 | Morin | H04L 41/142 |
| 11,507,860 | B1 * | 11/2022 | Hodgman | H04L 63/1425 |
| 11,895,372 | B1 * | 2/2024 | Sanghavi | H04N 21/4826 |
| 12,028,368 | B1 * | 7/2024 | Cohen | G06F 21/6218 |
| 12,126,643 | B1 | 10/2024 | Skarphedinsson | |
| 2018/0129810 | A1 | 5/2018 | Kim | |
| 2022/0141247 | A1 * | 5/2022 | Shakarian | H04L 63/1433 726/25 |
| 2022/0215100 | A1 * | 7/2022 | Waplington | G06F 21/577 |
| 2023/0034866 | A1 | 2/2023 | Hodgman | |
| 2023/0205892 | A1 | 6/2023 | Wareus | |
| 2024/0427879 | A1 | 12/2024 | Bulut | |
| 2025/0080579 | A1 | 3/2025 | Mushtaq | |
| 2025/0124475 | A1 * | 4/2025 | Carlson | G06Q 30/0282 |
| 2025/0158959 | A1 | 5/2025 | Kang | |
| 2025/0265418 | A1 | 8/2025 | Kasuya | |

FOREIGN PATENT DOCUMENTS

| | | | | |
|---|---|---|---|---|
| CN | 110213212 | A * | 9/2019 | H04L 63/1408 |
| CN | 110708292 | A * | 1/2020 | |
| CN | 118364476 | B | 8/2024 | |
| CN | 119011300 | A | 11/2024 | |
| CN | 119760712 | A | 4/2025 | |
| KR | 102079687 | B1 * | 2/2020 | |
| KR | 20200056627 | A | 5/2020 | |

(Continued)

OTHER PUBLICATIONS

Baek, J. English translation of KR 20210091953 A. (Year: 2021).*

(Continued)

*Primary Examiner* — Sarah Su
(74) *Attorney, Agent, or Firm* — Law Office of Scott P. Zimmerman, PLLC

(57) ABSTRACT

Prediction of CPEs using banners greatly improves computer functioning. Many web services have an unknown common platform enumeration (CPE). When the CPE is unknown, a computer system is unable to obtain cybersecurity flaws and software fixes for a software product or web service. A CPE, though, is predicted by banner-prompting an AI/ML model using a web service banner. Once the CPE is predicted, vulnerabilities may be identified.

20 Claims, 34 Drawing Sheets

(56) References Cited

FOREIGN PATENT DOCUMENTS

| | | | | | |
|---|---|---|---|---|---|
| KR | 20210091953 | A | * | 7/2021 | |
| KR | 20230077073 | A | * | 6/2023 | |
| KR | 20240178195 | A | * | 12/2024 | |
| WO | WO-2008101289 | A1 | * | 8/2008 | .............. H04W 4/00 |
| WO | WO-2021160822 | A1 | * | 8/2021 | ........... G06F 21/577 |
| WO | WO-2025115162 | A1 | | 6/2025 | |

OTHER PUBLICATIONS

Pothamsetty, Venka, "How to Generate CPE information from Software Using Generative AI," https://transilience.freshdesk.com/support/solutions/articles/154000142201, accessed on or about Nov. 25, 2024.

Wareus, Emil, and Hell, Martin, "Automated CPE Labeling of CVE Summaries with Machine Learning," Springer Nature Switzerland AG 2020, 20 pages.

https://www.aimodels.fyi/papers/arxiv/distalaner-distantly-supervised-active-learning-augmented-named, accessed on or about Nov. 25, 2024.

Banerjee, Somnath et al., "DISTALANER: Distantly Supervised Active Learning Augmented Named Entity Recognition in the Open Source Software Ecosystem," 21 pages, 2024.

Hu et al., "CPE-Identifier: Automated CPE identification and CVE summaries annotation with Deep Learning and NLP," experarXiv:2405.13568v1 [cs.CR] May 22, 2024, 12 pages.

Huff, Philip et al., "A Recommender System for Tracking Vulnerabilities," The 16th International Conference on Availability, Reliability and Security (ARES 2021), Aug. 17-20, 2021, Vienna, Austria. ACM, New York, NY, USA, 7 pages. https://doi.org/10.1145/3465481.3470039.

Janovsky, Adam et al., "sec-certs: Examining the security certification practice for better vulnerability mitigation," Masaryk University, Brno, Czechia, arXiv:2311.17603v2 [cs.CR] Jul. 1, 2024, 27 pages.

Mcclanahan, Kylie et al., "Towards Automatically Matching Security Advisories to CPEs: String Similarity-based Vendor Matching," 2024 Workshop on Computing, Networking and Communications (CNC), 6 pages.

Glanz et al., "A Vulnerability's Lifetime: Enhancing Version Information in CVE Database," Proceedings of the 15th International Conference on Knowledge Technologies and Data-driven Business (i-KNOW'15), Oct. 2015, 4 pages.

Sadlek et al., "Current Challenges of Cyber Threat and Vulnerability Identification Using Public Enumerations," ARES 2022, Jun. 29, 2022, Vienna, Austria, 8 pages.

Kim et al., "A Design of Automated Vulnerability Information Management System for Secure Use of Internet-Connected Devices Based on Internet-Wide Scanning Methods," IEICE Trans. Inf. & Syst., vol. E104-D, No. 11 Nov. 2021, 9 pages.

* cited by examiner

| Field | Type | Description | Example |
|---|---|---|---|
| cpeName | str | CPE Name | cpe:2.3:a:apache:http_server:1.0.2:*:*:* |
| vendor | str | vendor name | apache |
| product | str | product name | http_server |
| vendor:product | str | vendor:product combination | apache:http_server |
| vendor_count | int | count of unique vendors for that product name | 1 |

```
root@kali:~# curl -s -I 192.168.0.11
HTTP/1.1 200 OK
Date: Fri, 03 Jul 2020 19:11:08 GMT
Server: Apache/2.4.29 (Ubuntu)
Last-Modified: Sun, 21 Jun 2020 19:07:07 GMT
ETag: "2aa6-5a89cd520737c"
Accept-Ranges: bytes
Content-Length: 10918
Vary: Accept-Encoding
Content-Type: text/html
```

| Field | Type | Description | Example |
| --- | --- | --- | --- |
| ip_address | str | IP Address | 104.77.227.179 |
| port | bigint | port number | 443 |
| transport | str | transport protocol | tcp |
| timestamp | timestamp | timestamp of service | 2024-07-02T15:32:58.779918 |
| banners | str | HTML response of http/s request | <HTML><HEAD>\n<TITLE>Invalid URL</TITLE>\n</HE... |
| attributes | str | Attribute metadata response from banner grabbing | {"cookies": [], "favicon_fingerprint": null, "server": "nginx", ... |
| protocol | str | protocol of service | http |
| cpes | list of strings | Yara-predicted CPEs | ["cpe:/a:php:php:5.3.3", "cpe:/a:apache:http_server"] |

| Metric | Result |
|---|---|
| Homogeneity | 0.987 |
| Completeness | 0.789 |
| V-Measure | 0.877 |
| Label Coverage | 0.448 |

Figure 25:
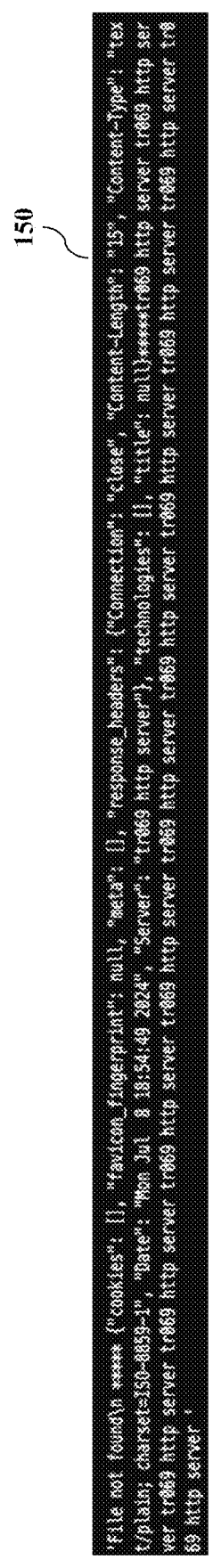

'File not found\n ***** {"cookies": [], "favicon_fingerprint": null, "meta": [], "response_headers": {"Connection": "close", "Content-Length": "15", "Content-Type": "tex
t/plain; charset=ISO-8859-1", "Date": "Mon Jul  8 18:54:49 2024", "Server": "tr069 http server"}, "technologies": [], "title": null}*****tr069 http server tr069 http ser
ver tr069 http server tr069 http server tr069 http server tr069 http server tr069 http server tr069 http server tr069 http server tr069 http server tr069 http server tr0
69 http server '

Figure 27:
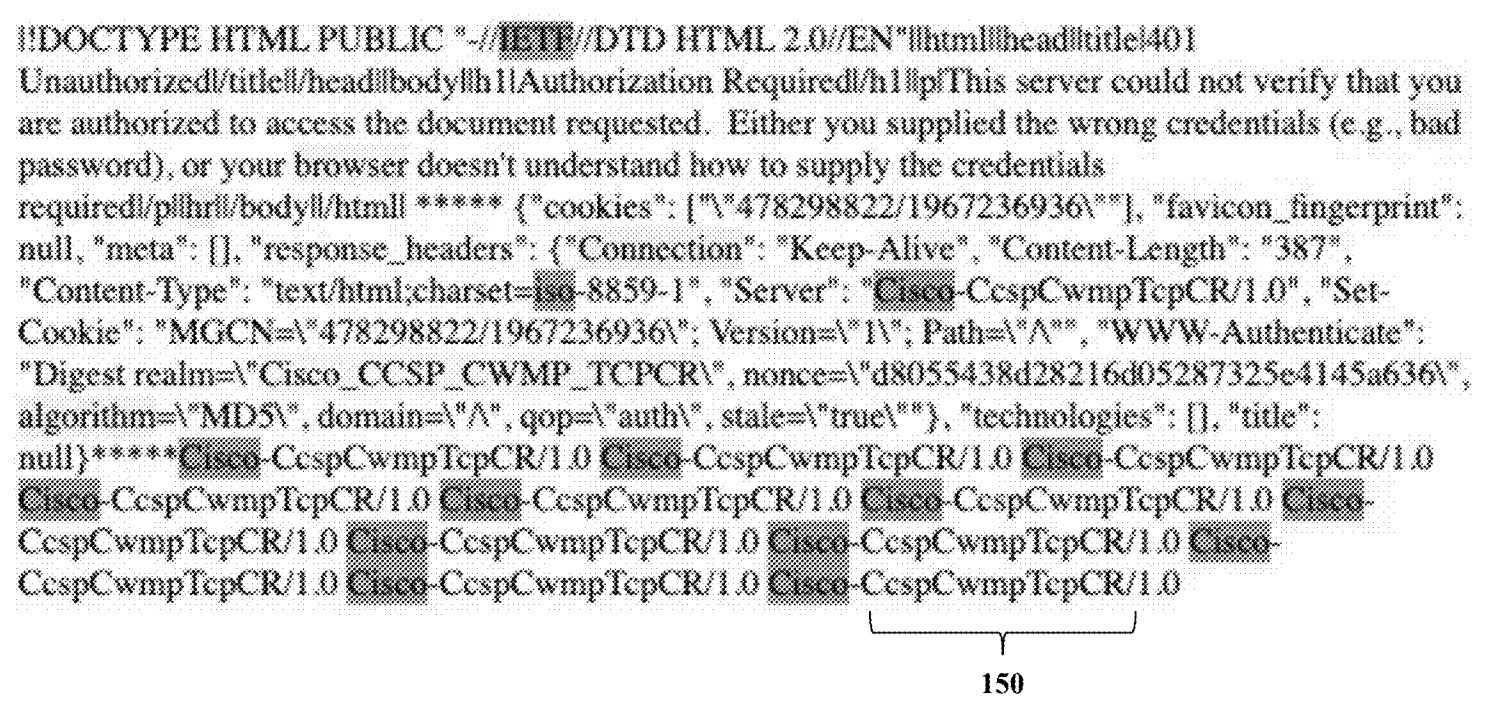

|!DOCTYPE HTML PUBLIC "-//IETF//DTD HTML 2.0//EN"||html||head||title|401 Unauthorized|/title||/head||body||h1|Authorization Required|/h1||p|This server could not verify that you are authorized to access the document requested. Either you supplied the wrong credentials (e.g., bad password), or your browser doesn't understand how to supply the credentials required|/p||hr||/body||/html| *** {"cookies": ["\"478298822/1967236936\""], "favicon_fingerprint": null, "meta": [], "response_headers": {"Connection": "Keep-Alive", "Content-Length": "387", "Content-Type": "text/html;charset=iso-8859-1", "Server": "Cisco-CcspCwmpTcpCR/1.0", "Set-Cookie": "MGCN=\"478298822/1967236936\"; Version=\"1\"; Path=\"/\"", "WWW-Authenticate": "Digest realm=\"Cisco_CCSP_CWMP_TCPCR\", nonce=\"d8055438d28216d05287325e4145a636\", algorithm=\"MD5\", domain=\"/\", qop=\"auth\", stale=\"true\""}, "technologies": [], "title": null}***Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0 Cisco-CcspCwmpTcpCR/1.0

File not found
*** {"cookies": [], "favicon_fingerprint": null, "meta": [], "response_headers": {"Connection": "close", "Content-Length": "15", "Content-Type": "text/plain; charset=ISO-8859-1", "Date": "Mon Jul 8 18:54:49 2024", "Server": "tr069 http server"}, "technologies": [], "title": null}***tr069 http server tr069 http server tr069 http server tr069 http server tr069 http server tr069 http server tr069 http server tr069 http server tr069 http server tr069 http server tr069 http server tr069 http server tr069 http server

| Metric | Result |
|---|---|
| % Services with at least 1 identified CPE | 80.8% |
| >0 Service CPE coverage increase | 19.3% |
| Unknown service CPE coverage | 47.6% |
| Unique CPEs identified (number of clusters) | 124 |
| Unique CPE discovery multiple | 0.72x |

CPE PREDICTION USING BANNER-PROMPTED AI/ML MODELING

BACKGROUND

The subject matter described herein generally relates to electrical communications and to computer security and, more particularly, the subject matter relates to computer vulnerability analysis.

Many computers are exposed to cybersecurity threats. It seems every day there is another cybersecurity hack that steals account passwords, business data, and personal information. Large computer networks, in particular, are especially vulnerable to cybersecurity threats. Large computer networks may have hundreds or even thousands of computers, so it's increasingly difficult to monitor such large numbers of computers. Many of these computers may unknowingly connect to the Internet and/or run outdated software, so these computers are especially vulnerable to cybersecurity threats.

SUMMARY

Accurate prediction of common platform enumeration (CPE) helps resolve cybersecurity vulnerabilities. Many software products and web services have an unknown CPE. The CPE identifies known cybersecurity vulnerabilities and software fixes. When the CPE is unknown, however, the cybersecurity vulnerabilities remain unresolved and computer functioning is jeopardized. A CPE prediction service, though, identifies which CPEs should be matched to their corresponding software products and web services. The CPE prediction service grabs web service banners and predicts the CPEs by banner-prompting an artificial intelligence and/or machine learning model. The CPE prediction service identifies a CPE that matches or belongs to a software product or web service, based on the web service banners. The CPE prediction service thus elegantly and quickly matches a CPE to its corresponding software product or web service. Once the CPE is known, its cybersecurity vulnerabilities may be fixed and computer functioning is improved.

BRIEF DESCRIPTION OF THE SEVERAL VIEWS OF THE DRAWINGS

The features, aspects, and advantages of common platform enumeration (or CPE) prediction using a banner-prompted AI/ML model are understood when the following Detailed Description is read with reference to the accompanying drawings, wherein:

FIGS. 4-9 illustrate some examples of a common platform enumeration (or CPE) prediction service;

FIGS. 17-19 illustrate examples of scheme evaluation and test results;

FIGS. 24-28 illustrate more examples of clusteral interpretation;

FIG. 29 numerically illustrates the improved computer functioning;

DETAILED DESCRIPTION

Figure 1:
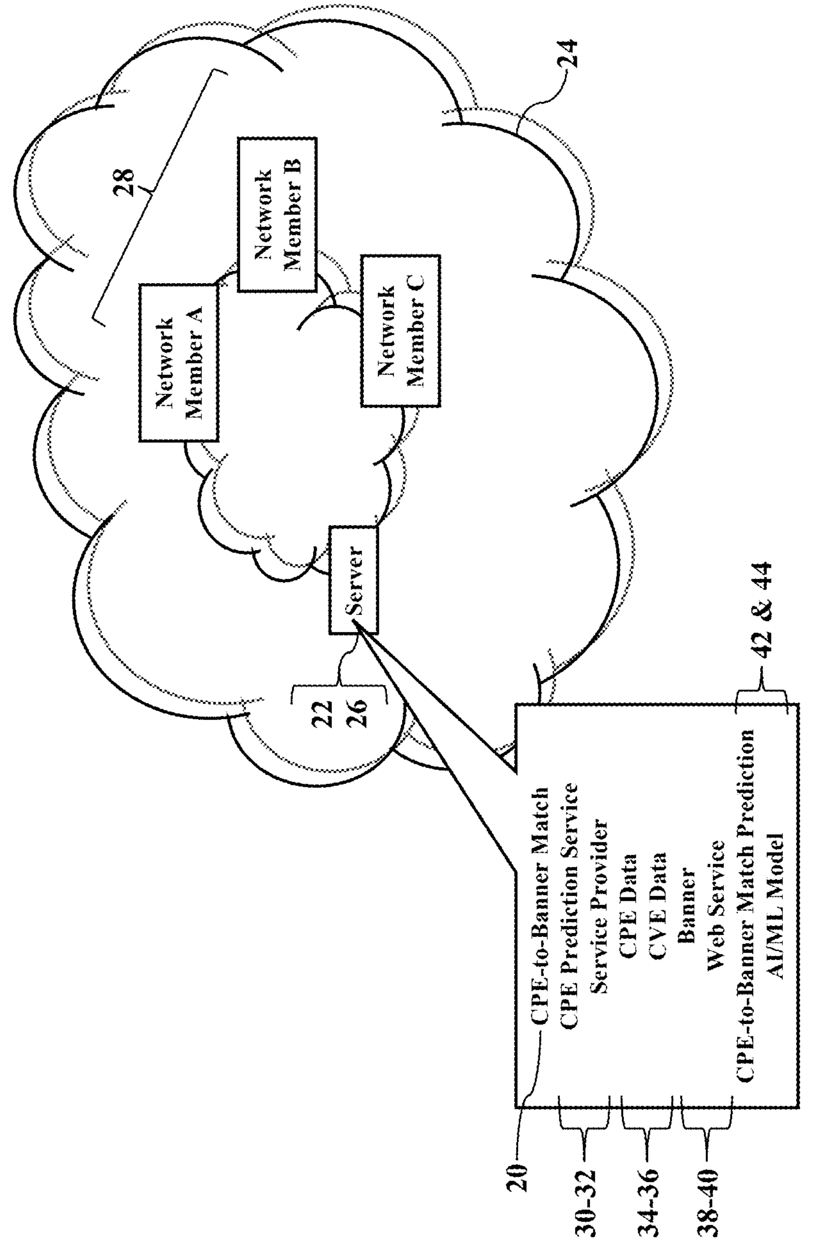
FIGS. 1-3 illustrate some examples of predicting CPE-to-banner matches.

Old and outdated software is especially vulnerable to cybersecurity threats. As we all know, nearly every day there is another cybersecurity hack that steals account passwords, business data, and personal information. Many of these cybersecurity hacks can be traced back to old and outdated software. People and companies simply fail to update their computer software with the latest fixes. Indeed, some companies are still using years-old or even decades-old software that is easily exploited by hackers.

Some examples relate to predicting when computers need software updates. A common platform enumeration (or CPE) prediction service simply, quickly, and elegantly predicts when a computer needs a software update. The CPE prediction service, in particular, identifies computers that are unknowingly connected to the public Internet. These unknown, Internet-facing computers are blind spots to users and to IT administrators. These unknown, Internet-facing computers may thus be riddled with vulnerable software. The CPE prediction service, however, identifies a computer that connects to the public Internet. The CPE prediction service then also predicts one or more software vendors, products, and versions that are installed to the computer. The CPE (e.g., the Common Platform Enumeration) is a structured naming schema for IT systems, software, and packages. The CPE format is as follows:

cpe:<cpe_version>:<part>:<vendor>:<product>:<version>:<update>:<edition>:<language>:<sw_edition>:<target_sw>:<target_hw>:<other>

An example of the CPE may be "cpe:2.3:a:microsoft:internet_explorer:8.0.6001:beta:*:*:*:*:*" CPEs are the core way to identify the CVEs (Common Vulnerability Enumerations) that affect the identified product. CVE stands for Common Vulnerabilities and Exposures. It's a list of publicly known computer security flaws, or vulnerabilities, in software and hardware. So, once the CPE prediction service predicts what software is installed to the computer, the CPE prediction service may then quickly and easily determine whether the software is out of date. The CPE prediction service, for example, may use the predicted software vendor/product/version to lookup the known vulnerabilities, patches, and other updates. The CPE prediction service may thus alert consumers and companies that they have an Internet-exposed computer running outdated software that is vulnerable to cybersecurity attacks.

The CPE prediction service will now be described more fully hereinafter with reference to the accompanying drawings. The CPE prediction service, however, may be embodied in many different forms and should not be construed as limited to the examples set forth herein. These examples are provided so that this disclosure will be thorough and complete and fully convey the CPE prediction service to those of ordinary skill in the art. Moreover, all the examples of the CPE prediction service are intended to encompass both structural and functional equivalents thereof. Additionally, it is intended that such equivalents include both currently known equivalents as well as equivalents developed in the future (i.e., any elements developed that perform the same function, regardless of structure).

Figure 2:
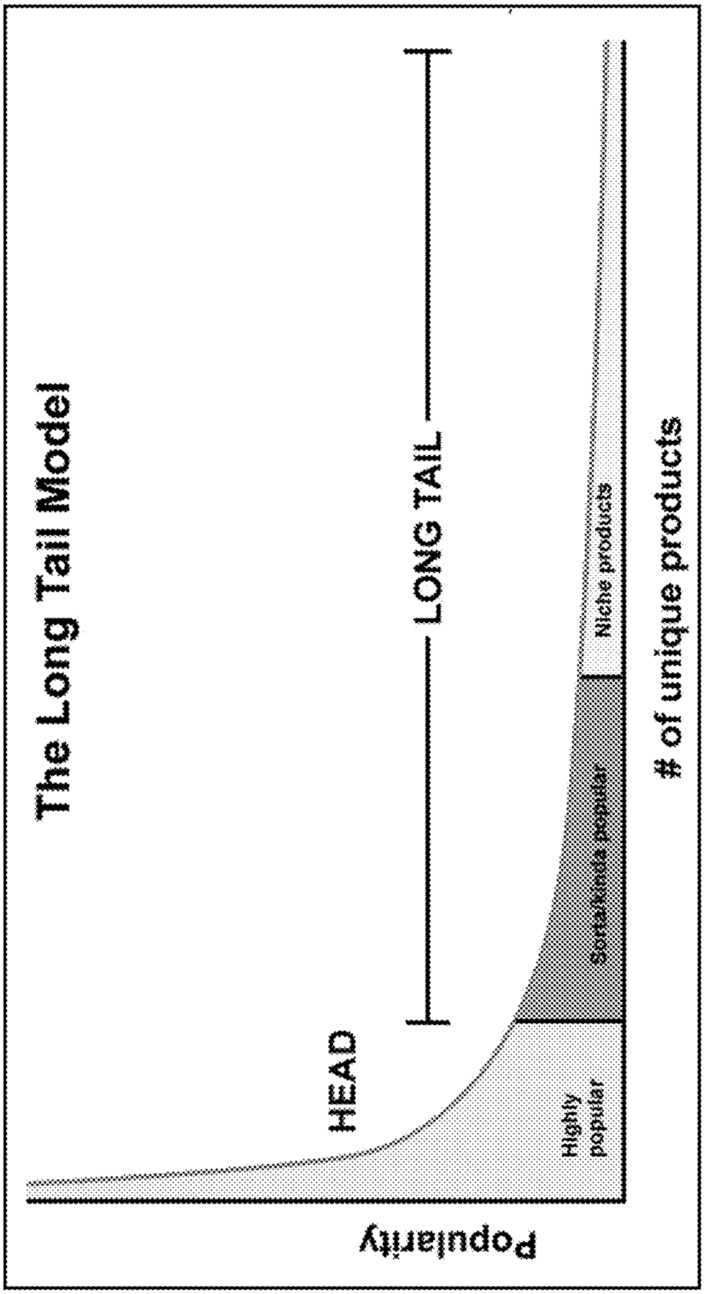
Figure 3:
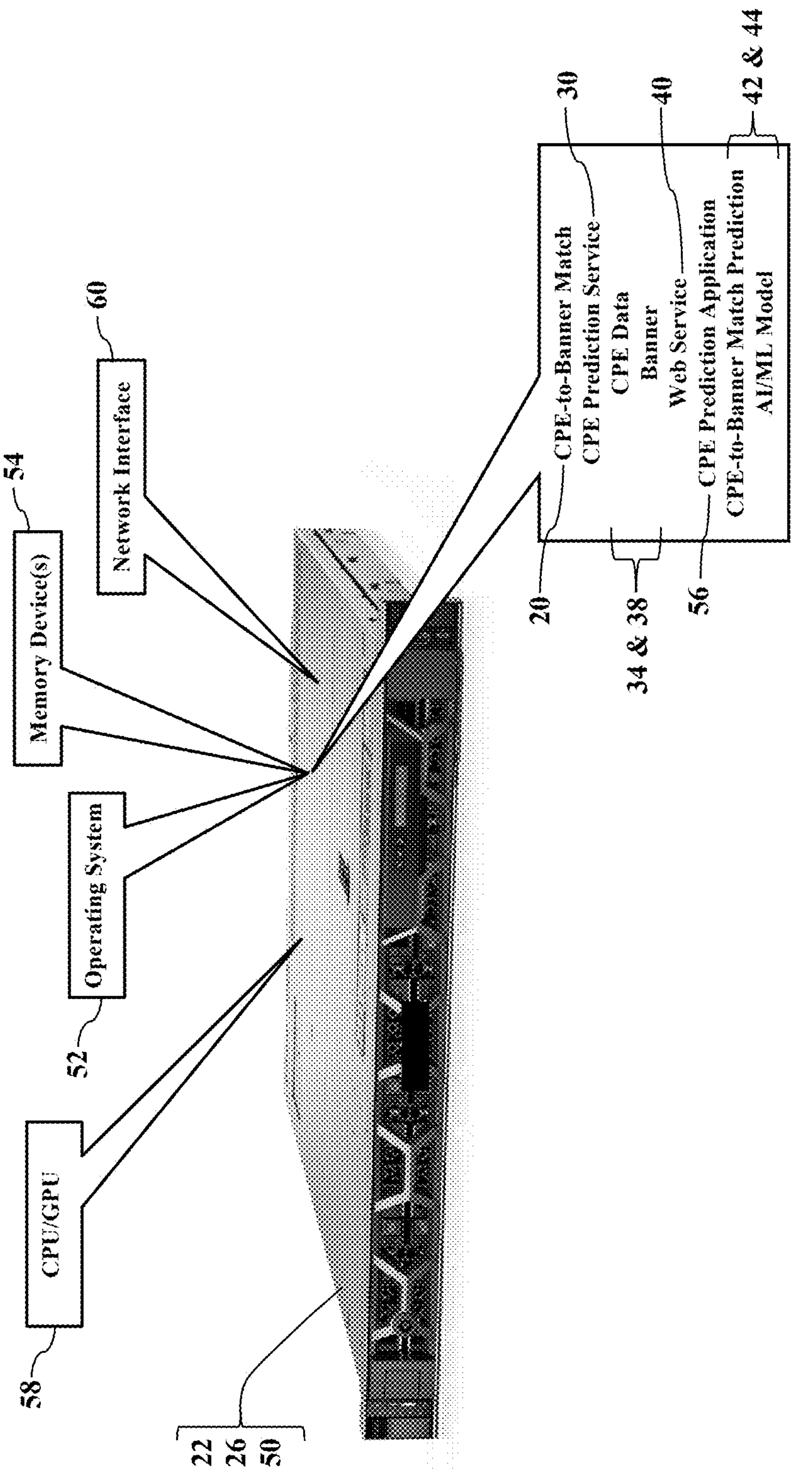

FIGS. 1-3 illustrate some examples of predicting CPE-to-banner matches 20. A computer system 22 operates in a cloud computing environment 24. FIG. 1 illustrates the computer system 22 as a server 26. The computer system 22, though, may be any processor-controlled device, as later paragraphs will explain. In this example, the server 26 communicates via the cloud computing environment 24 (e.g., public Internet, private network, and/or hybrid network) with other servers, devices, computers, or other networked members 28 operating within, or affiliated with, the cloud computing environment 24. The cloud computing environment 24 provides a common platform enumeration (or CPE) prediction service 30 on behalf of a service provider 32. The CPE prediction service 30 retrieves or acquires common platform enumeration (or CPE) data 34. The CPE prediction service 30 may also retrieve or acquire common vulnerabilities and exposures (or CVE) data 36. The CVE data 36 describes known cybersecurity vulnerabilities and exposures for the corresponding CPE data 34. The CPE prediction service 30 also retrieves or acquires one or more service banners 38 that are associated with a software-based web service 40. The cloud computing environment 24 may then analyze the CPE data 34, the CVE data 36, and/or the service banner(s) 38 to generate a CPE-to-banner match prediction 42 using an artificial intelligence (AI) or machine learning (ML) model 44. The CPE-to-banner match prediction 42, in plain words, predicts which one or more CPEs match, belong to, or provide the web service 40.

As FIG. 2 illustrates, accurate identification of CPEs and CVEs has long been a problem. Computers have been around for decades, and computer software services have exponentially grown. It's estimated, for example, that, over the decades, there have been nearly 43,000 known software applications (e.g., vendor: product CPEs) in the field, representing a long-tail distribution of niche products that are prominent across organizations. Today, however, conventional rules-based schemes (such as YARA rules) only cover about 318 of these CPEs. Because each rule requires hours of work to write and validate, it's simply not humanly practical, nor economically feasible, to implement rules that define all the 43,000 known computer software services 40 (such as different software products/versions offered by many different vendors). Indeed, it's estimated that nearly 40% of HTTP/HTTPS services have zero/no CPE coverage from existing rules. Many computer software services 40, for example, are old, legacy, or unpopular versions that are still in use. Because many computer software services 40 lack their corresponding CPE data 34, these computer software services 40 are especially vulnerable to cyberattacks. Because the CPE data 34 is unknown, it's very difficult for IT administrators to determine the CVE data 36. So, simply put, if the CPE data 34 is unknown, IT and cybersecurity professionals can't search the CVE data 36 for the corresponding web service 40. Without the CPE data 34, IT and cybersecurity professionals are blind to the cybersecurity risks associated with the web service 40.

Returning to FIG. 1, the CPE prediction service 30, though, predicts which CPE data 34 corresponds to the CVE data 36 and to the web service 40. When the cloud computing environment 24 receives the CPE data 34, the CVE data 36, and/or the service banner 38 associated with the web service 40, the nodal networked members 28 inspect and analyze the CPE/CVE data 34/36 and the banner 38. While there may be many networked members 28 of the cloud computing environment 24, FIG. 1 illustrates a simple example using the server 26. That is, when the cloud computing environment 24 receives the CPE data 34, the CVE data 36, and/or the service banner 38, the nodal networked members 28 may forward the CPE data 34, the CVE data 36, and the service banner 38 to the server 26. The server 26 is programmed to predict the CPE data 34 that corresponds to the web service 40, using the AI/ML model 44. The server 26 generates the CPE-to-banner match prediction 42 that identifies which CPE data 34 corresponds to the web service 40.

As FIG. 3 illustrates, the server 26 is programmed to predictively match the CPE data 34 to the web service 40. FIG. 3 illustrates the server 26 as a rack server 50, which is commonly installed in server rooms and in server farms. The server 26/50 is programmed to provide the common platform enumeration (or CPE) prediction service 30. The server 26/50 predicts the CPE data 34 that corresponds to the web service 40 using the service banner 38 and the AI/ML model 44. The server 26/50 stores and executes an operating system 52 in a memory device 54. The server 26/50 also stores a cybersecurity CPE prediction application 56 in the memory device 54. The server 26/50 has a hardware processor with cores 58 (illustrated as "CPU/GPU") that reads and executes the operating system 52 and the cybersecurity CPE prediction application 56. The server 26/50 also has network interfaces 60 to multiple communications networks (such as the cloud computing environment 24 illustrated in FIG. 1), thus allowing bi-directional communications with other networked devices and services. The cybersecurity CPE prediction application 56 has programming code or instructions that cause the server 26 to perform operations, such as determining the CPE-to-banner match 20 by generating the CPE-to-banner match prediction 42. The cybersecurity CPE prediction application 56 thus programs the server 26/50 to predict whether the CPE data 34 corresponds to the web service 40, using the AI/ML model 44 and banner data representing the banner 38.

Figure 4:
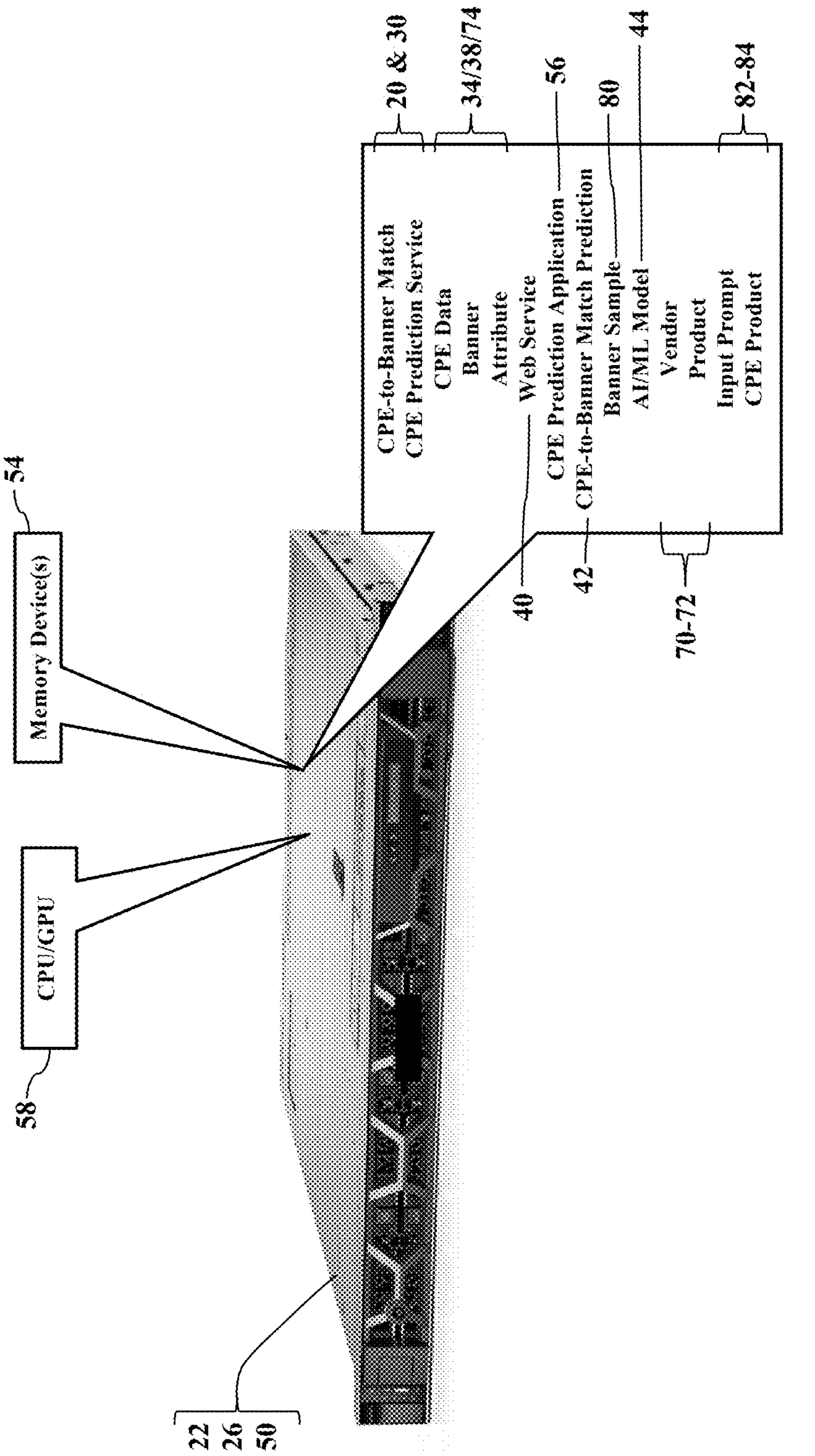
Figure 5:
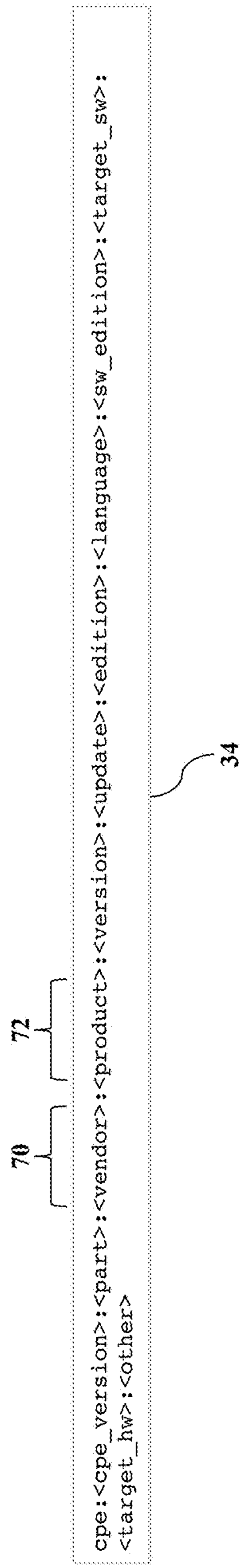
Figure 6:
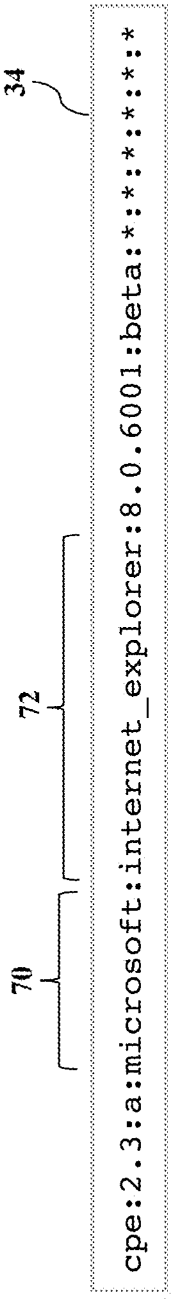
Figure 8:
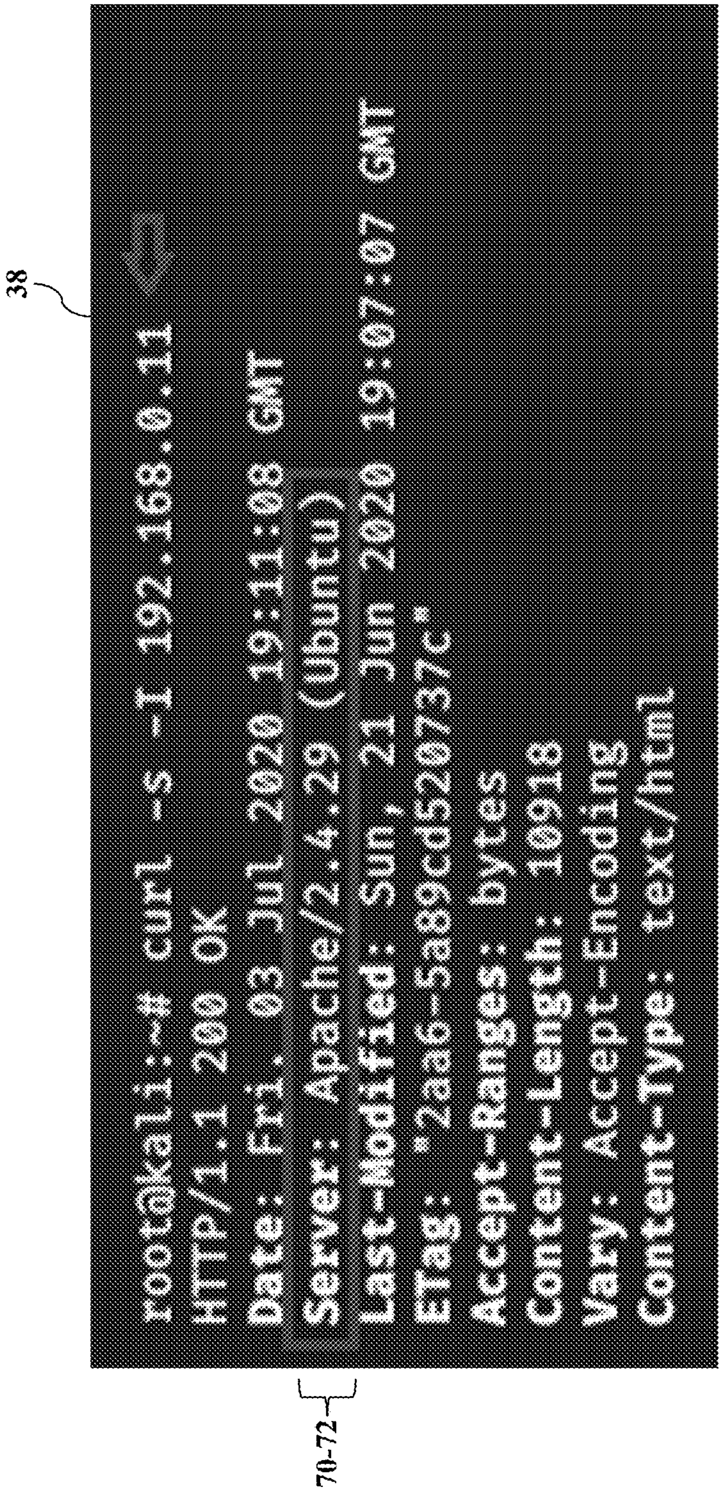

FIGS. 4-9 illustrate some examples of the common platform enumeration (or CPE) prediction service 30. FIG. 4 illustrates the computer system 22 (again illustrated as the rack server 50) providing the CPE prediction service 30. The CPE prediction application 56 may cause or instruct the server 26/50 to retrieve the CPE data 34. FIGS. 5-7 illustrate examples of the data fields representing the CPE data 34. FIG. 6, in particular, illustrates the CPE data 34 identifying the MICROSOFT INTERNET EXPLORER® in a vendor data field 70 and in product data field 72. FIG. 7 illustrates a tabularized version of more CPE data 34 identifying an APACHE® web server product (e.g., the vendor data field 70 and the product data field 72). The CPE prediction application 56 may also cause or instruct the server 26/50 to retrieve the banner data representing the banner 38. FIGS. 8-9 illustrate examples of the banner data fields representing the banner 38. The banner 38 may thus also identify or specify the vendor 70 and a product 72 (such as an APACHE® web server running the UBUNTU® operating system, version 2.4.29). FIG. 9, in particular, illustrates a tabularized version of more banner data, with the banner 38 specifying a metadata banner attribute 74.

Returning to FIG. 4, artificial intelligence and/or machine learning may be used. The CPE prediction application 56 may instruct the server 26/50 to generate and/or to retrieve a validation banner sample 80. The banner sample 80 may describe or contain labeled banners 38, attributes 74, and/or web services 40 associated with hundreds or even thousands of CPEs (e.g., the CPE data 34). The CPE prediction service 30, for example, may use passive or active banner grabbing techniques that periodically or randomly send HTTP/HTTPS queries to public and/or private IP addresses (as this disclosure will later explain). The CPE prediction service 30 may then receive and log the banners/attributes 38/74 that are sent as HTTP/HTTPS responses. Each banner/attribute 38/74 describes information about a remote/networked computer system hosting the corresponding web service 40. Each banner 38 may also describe the metadata attribute 74 associated with the remote/networked computer system hosting the corresponding web service 40. The banners/attributes 38/74 may then be initially labeled (such as by using human review and/or by using YARA rules). The server 26/50 may thus acquire the banner sample 80 describing hundreds or thousands of the web services 40 and/or their corresponding banner/attribute 38/74 and the CPE vendor/product 70/72 (e.g., the CPE data 34). As an example, prototype testing generated the banner sample 80 by randomly sampling 100,000 web services 40, with about 63% of the web services 40 having at least one CPE labeled/identified using YARA rules.

The banner sample 80 may then be applied to the AI/ML model 44. The banner sample 80 may correlate several or even hundreds/thousands of CPE products 70/72 (e.g., the labeled CPE data 34) to their corresponding labeled banners 38, attributes 74, and/or web services 40. The CPE prediction service 30 may then train the AI/ML model 44 using the banner sample 80 (as later paragraphs will explain). The CPE prediction service 30 may thus use the trained/learned AI/ML model 44 as a CPE predictor engine. The CPE prediction service 30 and the CPE prediction application 56 may then generate the CPE-to-banner match prediction(s) 42 by banner-prompting the AI/ML model 44. The CPE prediction application 56, for example, may input prompt 82 the AI/ML model 44 with one or more of the banners/attributes 38/74, and the AI/ML model 44 predicts one, or more, CPE products 84 (i.e., the CPE data 34) based on the inputted banners/attributes 38/74.

Because the CPE data 34 is associated with the banner/attribute 38/74, the CPE prediction application 56 may further predict/determine the CPE vendor 70 and the CPE product 72 associated with the banner/attribute 38/74. The CPE prediction service 30 banner-prompts the AI/ML model 44, and the AI/ML model 44 responds or outputs with the predicted CPE product(s) 84 (e.g., such as by specifying the corresponding/matching CPE data 34). Once the CPE data 34 is predicted, the CPE prediction application 56 that then identify the corresponding CPE vendor 70 and the CPE product 72 (such as by reading the web service banner 38 and/or by reading the predicted CPE data 34, as illustrated by FIGS. 5-9). That is, by predicting the CPE data 34 that corresponds with the prompting banner(s)/attribute(s) 38/74, the CPE data 34 is also associated with the corresponding web service 40. The CPE prediction application 56 may thus use the web service banner/attribute 38/74 and/or the CPE data 34 to determine the CPE vendor 70 and the CPE product 72/84 that provides the web service 40.

The CPE prediction service 30 identifies novel CPE products and vendors. Conventional CPE schemes use custom rules (such as YARA rules and regular expressions) that are very difficult and time-consuming to define. Because the conventional rules are so complex, conventional CPE schemes are too difficult and too expensive to implement for all CPEs. The conventional CPE schemes thus leave a large chunk of computer software services with unidentified CPEs. The CPE prediction service 30, though, elegantly uses data mining and artificial intelligence (e.g., the AI/ML model 44) to discover new relationships between CPE products (e.g. the CPE data 34) and computer software services 40. The CPE prediction service 30 identifies novel CPE products by banner-prompting the learned/trained AI/ML model 44 using the banners/attributes 38/74. The CPE prediction service 30 recognizes that the CPE vendor/product data field(s) 70-72 is/are perhaps an important data component of the CPE data 34 and a core identifier (e.g., the vendor: product field combination of the CPE data 34). Moreover, because the AI/ML model 44 is specifically/exclusively trained using the banners/attributes 38/74 (as later paragraphs will explain), the AI/ML model 44 outputs semantically-labeled CPE products (e.g., the vendor: product field combination of the CPE data 34).

Figure 10:
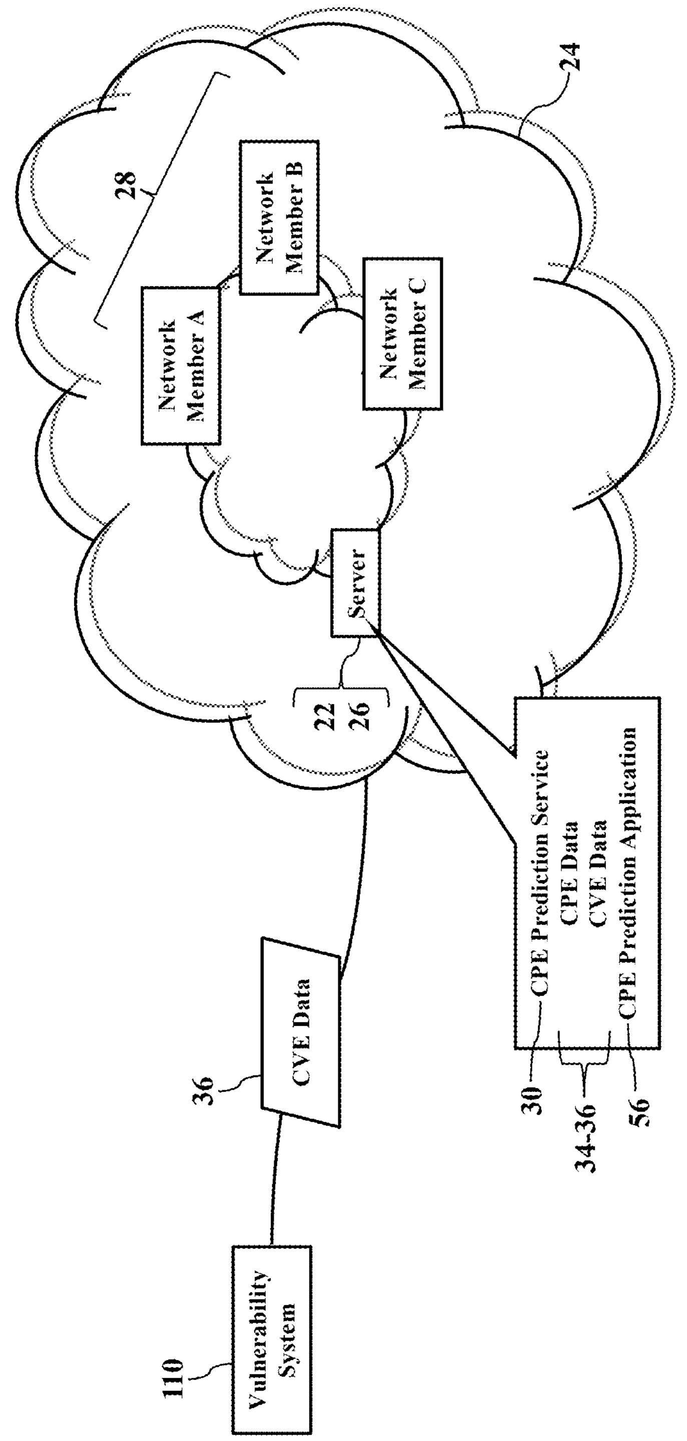
FIGS. 10-11 illustrate some examples of vulnerability identification.
Figure 11:
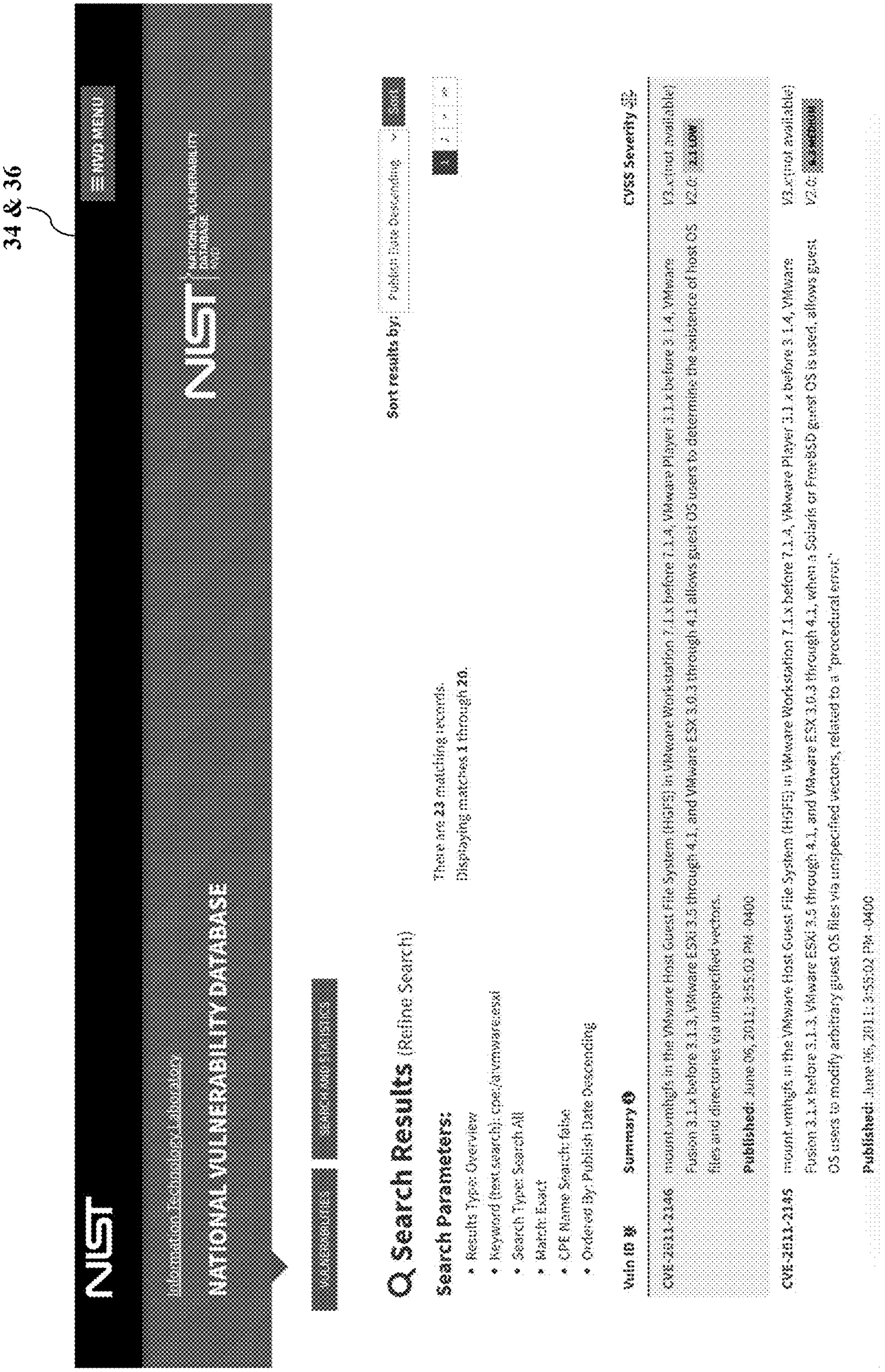

FIGS. 10-11 illustrate some examples of vulnerability identification. The CPE prediction service 30 elegantly and accurately predicts CPE products using the web service banners 38 and/or the attributes 74. The CPE prediction service 30 gathers data by pulling the CPE data 34 from VulnCheck and the National Vulnerabilities Database (NVD) as well as the web service banners 38 and the attributes 74 from IP address scans. Once the common platform enumeration (or CPE) data 34 is predictively matched to the web service 40, the CPE prediction service 30 may also retrieve the common vulnerabilities and exposures (or CVE) data 36 that corresponds to the CPE data 34. The CPE prediction application 56, for example, may instruct the server 26 to query a vulnerability system 110 for the CPE data 34. The CPE prediction service 30, as examples, may interface with the public National Vulnerability Database. The CPE prediction service 30, as more examples, may interface with private vulnerability systems (such as the VULNCHECK® system at www.vulncheck.com). Whatever vulnerability system 110 is used, the vulnerability system 110 sends a query response identifying the CVE data 36 that corresponds to the CPE data 34. As FIG. 11 illustrates, the CVE data 36 describes exploits, vulnerabilities, and other cybersecurity intelligence related to the CPE data 34. When the CPE prediction service 30 retrieves the CVE data 36, the CPE prediction application 56 may thus determine the cybersecurity vulnerabilities (and perhaps the solutions) that affect the vendor's product (such as, for example, vulnerabilities affecting Microsoft's INTERNET EXPLORER® illustrated in FIG. 6).

Figure 12:
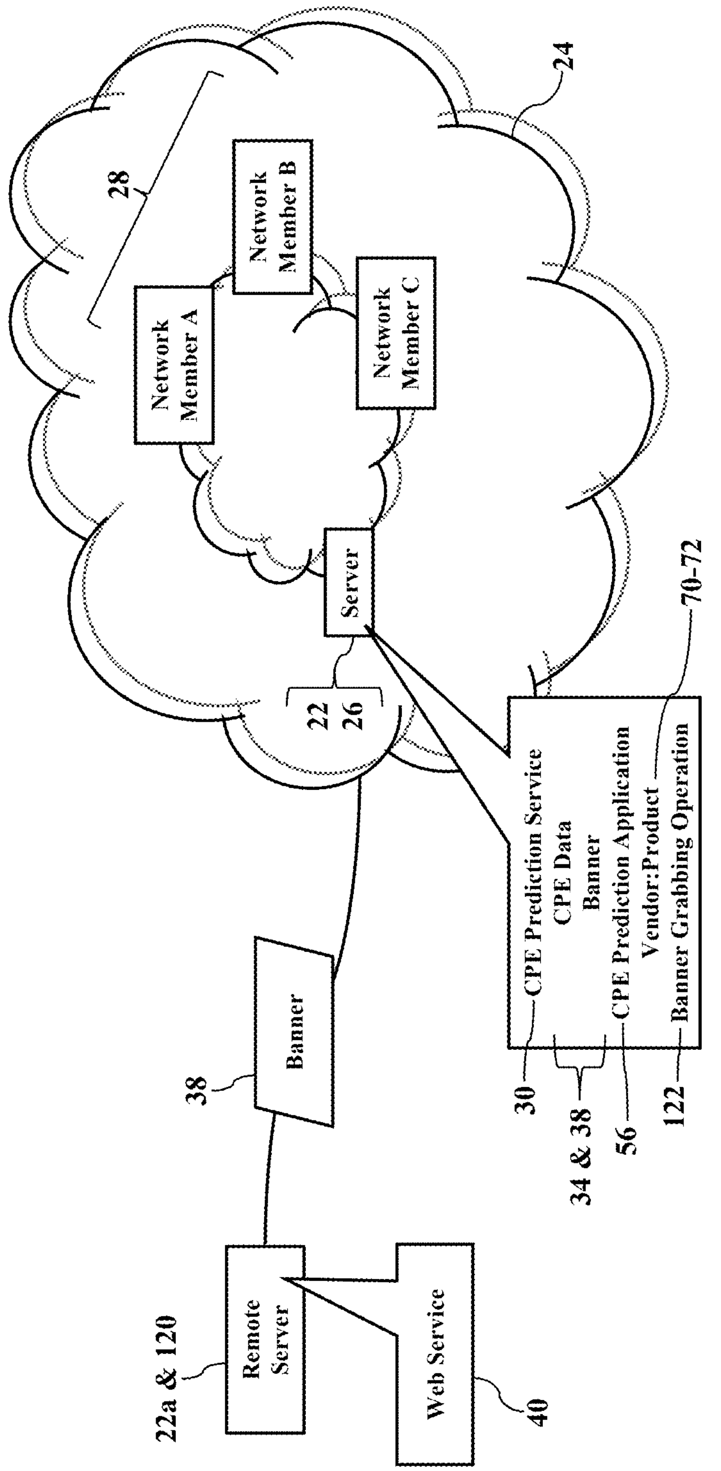
FIG. 12 illustrates some examples of banner grabbing.

FIG. 12 illustrates some examples of banner grabbing. The CPE prediction service 30 may retrieve the banner data representing the web service banner 38. The banner 38 describes information about a remote/networked computer system 22*a* (illustrated as another computer system 22*a* and remote server 120) hosting the web service 40. The banner 38 provides many service and server/device details. The banner 38, for example, may identify a port, the computer software service(s) 40 (e.g., the vendor: product fields 70-72 illustrated in FIGS. 4-9), and a software version running on the remote/networked computer system 22*a*/server 120 (again as illustrated in FIGS. 4-9). The CPE prediction service 30 may use a banner grabbing operation 122 to acquire the banner 38. The CPE prediction service 30, for example, may use passive or active banner grabbing techniques that periodically or randomly send HTTP/HTTPS queries to some or all publicly-available IP addresses. The CPE prediction service 30 may additionally or alternatively send HTTP/HTTPS queries to private network IP addresses. The CPE prediction service 30 may then receive and analyze the banners 38 that are sent as HTTP/HTTPS responses. The banner 38, for example, may include textual data that reveals the vendor: product fields 70-72. The banner 38 may further specify more data, such as HTTP/HTTPS headers, HTML links or content, robots.txt, sitemap.xml, security.txt, favicons, screenshots, web technologies, redirect intermediate data, and hostname. Once the banner(s) 38 is/are acquired, the CPE prediction service 30 may then use the AI/ML model 44 to predict the CPE products (as explained with reference to FIGS. 1-9).

The banners 38 may be regularly scanned. While the banner grabbing operation 122 may be performed according to any schedule or randomness, CPE prediction service 30 may conduct the banner grabbing operation 122 on a bi-weekly basis. The CPE prediction service 30 thus regularly scans IP addresses and exposes the corresponding web service 40.

Figure 13:
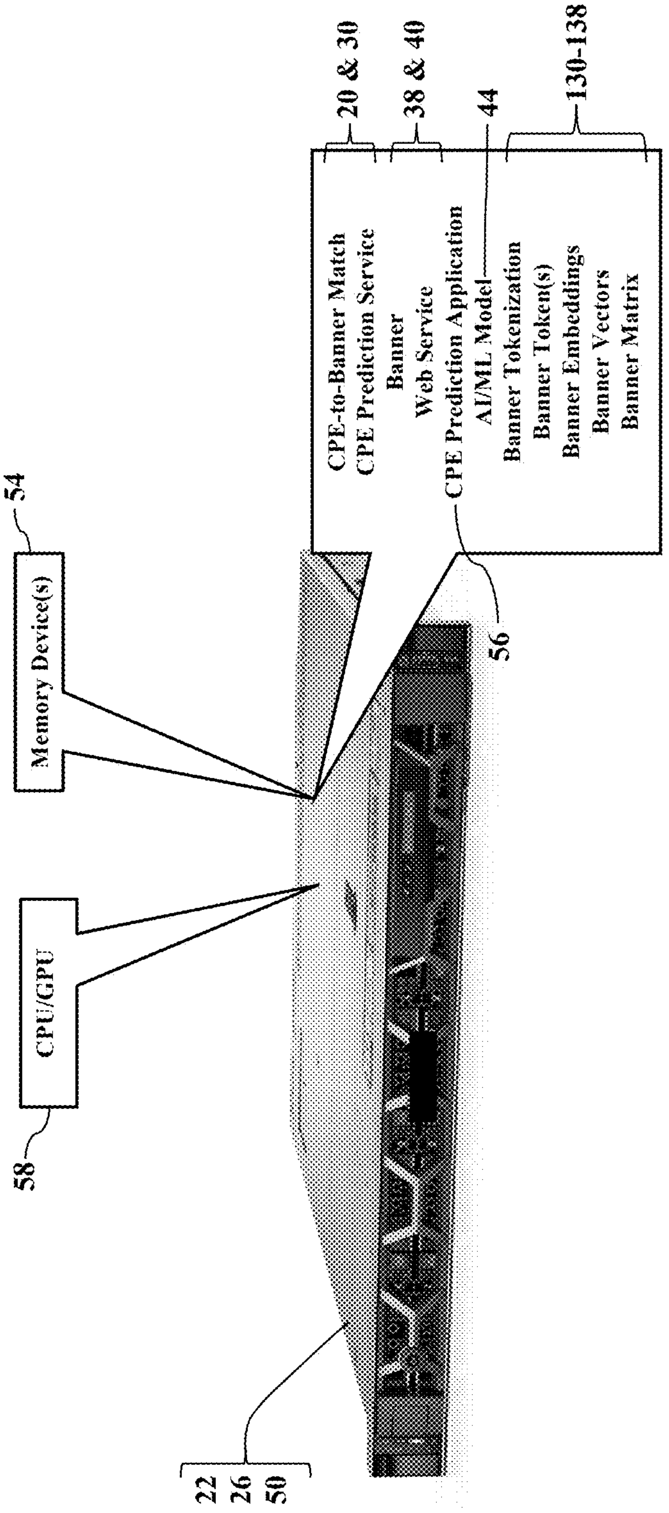
FIG. 13 illustrates more detailed examples of a service architecture.

FIG. 13 illustrates more detailed examples of the service architecture. The CPE prediction service 30 may use unsupervised or supervised AI/ML to predict the CPE data 34 across the computer software services 40 scanned by the banner grabbing operation 122 (as explained with reference to FIG. 12). The CPE prediction service 30 may pull the CPE data 34 from the vulnerability systems 110 (such as the National Vulnerability Database, the VULNCHECK system, or other as illustrated by FIGS. 10-11). The CPE prediction service 30 may additionally or alternatively pull the web service banners 38 (and their corresponding attributes 74 and other metadata) via the banner grabbing operation 122. The CPE prediction service 30 may then acquire the banner sample 80 having the CPE data 34 labeled with its corresponding web service banners 38 and attributes 74.

Figure 14:
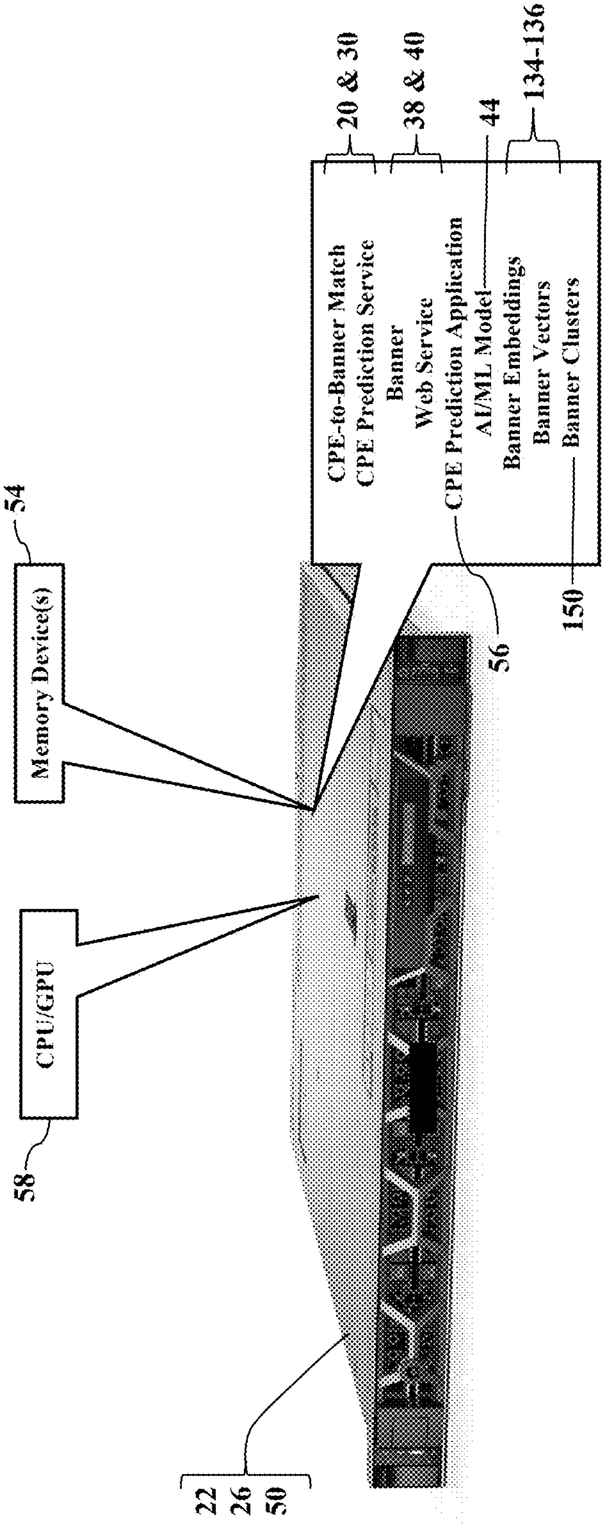
FIGS. 14-16 illustrate examples of banner clusters.

Data transformations and feature engineering may be performed using the banner data representing the web service banners 38. The computer system 22 (again illustrated as the server 26/50), for example, may tokenize the web service banners 38 using a banner tokenization operation 130. The banner tokenization operation 130, for example, uses concatenated textual service data representing the web service banner(s) 38 (as illustrated in FIG. 14). The CPE prediction application 56 may instruct or cause the server 26/50 to perform operations, such as generating one or more banner tokens 132 that represent the concatenated textual service data representing the web service banner(s) 38. The CPE prediction application 56 may thus tokenize the concatenated textual service data representing one or more of the web service banner(s) 38. The banner tokens 132, for example, represent words, character sets, or combinations of words and punctuation contained within the concatenated textual service data representing the web service banner(s) 38. While the banner tokenization operation 130 may use other schemes, FIG. 13 illustrates simple examples where the AI/ML model 44 tokenizes the web service banner(s) 38 as textual training data and analyze patterns and semantic relationships between the banner tokens 132. After training, for example, the AI/ML model 44 may use those patterns and relationships to generate a sequence of output tokens based on the inputted banner tokens 132. The CPE prediction application 56 may use a tokenization scheme or method, such as word tokenization, character tokenization, and subword tokenization, byte-pair encoding, and others as desired. The AI/ML model 44 may assign a unique banner token identifier to each banner token 132. The AI/ML model 44 may thus represent each web service banner 38 as a sequence of banner token identifiers.

Learned banner embeddings 134 may then be generated. While other embedding models/schemes may be used, FIG. 13 again illustrates simple examples where the AI/ML model 44 incorporates an embedding module that generates the banner embeddings 134. The AI/ML model 44, for example, may generate the banner embeddings 134 using the banner token identifiers. The banner embeddings 134 represent semantic relationships between the banner tokens 132. Each banner embedding 134 may be assigned to a corresponding one of the banner tokens 132, based on how commonly the corresponding banner token 132 is used together with, or in similar contexts to, the other banner tokens 132. After the AI/ML model 44 is trained (such as using the web service banner 38 and/or the banner tokens 132), the AI/ML model 44 may use the learned banner embeddings 134 to generate a predictive output (as still later paragraphs will explain). The CPE prediction service 30, as simple examples, may generate the banner tokens 132 that represent the vendor: product fields 70-72 (illustrated in FIGS. 4-12). The CPE prediction application 56 may further instruct the server 26/50 to generate a banner matrix 136 representing the banner embeddings 134 (and perhaps corresponding a banner vector 138) using the concatenated textual service data. The banner embeddings 134 thus determine the importance of a word in the concatenated textual service data representing the banner 38. The banner tokenization operation 130 may periodically re-fit (e.g., once per day) and transform with each batch of new web services 40.

Figure 15:
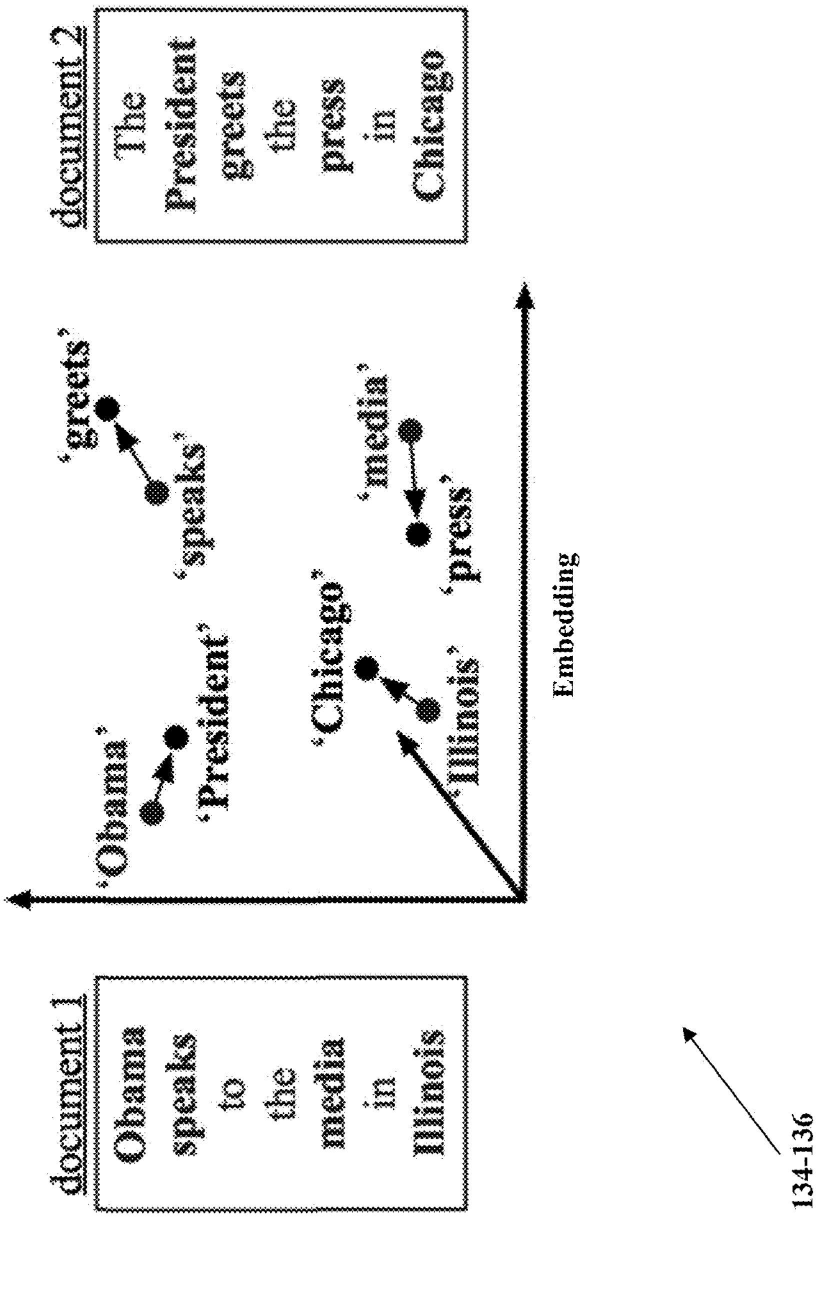

FIGS. 14-15 illustrate examples of banner clusters 150. Once the learned banner embeddings 134 (and their corresponding banner vectors 136) are determined, the CPE prediction service 30 may group or cluster the learned banner embeddings 134 into the banner clusters 150. The CPE prediction service 30, as simple examples, may input/feed/outsource the learned banner embeddings 134 to a clustering algorithm or service. The clustering algorithm or service analyzes the learned banner embeddings 134 in order to group similar web services 40 together.

The CPE prediction service 30 thus creates and clusters the learned banner embeddings 134 using the web service banners/attributes 38/74. The CPE prediction service 30 soft clusters the learned banner embeddings 134 in order to identify novel, prominent CPEs. In order to capture semantic meaning and their relation to other words in the web service banners/attributes 38/74 and html responses, the prototype testing trained Google's Word2vec natural language processing embedding model (i.e., the AI/ML model 44) on the keyword banner tokens 132 from a large sample (e.g. the banner sample 80) of 100,000 web services. Word2Vec trains a shallow neural network on these tokenized web service banners/attributes 38/74 using a "Continuous Bag of Words" method, which predicts a word based on its surrounding words. This shallow network is trained exclusively using the web service banners/attributes 38/74, and each banner's/attribute's weights may be updated using backpropagation. The prototype testing thus obtained a vector of weights that represent each word in the web service banner/attribute 38/74. Because the prototype testing trained Word2vec (i.e., the AI/ML model 44) on the underlying web service banners/attributes 38/74, words with similar meaning will typically have similar vector representations as each other. FIG. 15 illustrates, in particular, the intuition behind this in a 2D vector space.

The CPE prediction service 30 thus captures banner semantic content. Conventional schemes reply on keyword searching. Keyword searches, though, look for exact matches. In actual CPE practice, however, there are many cases where there could be words similar to those keywords or even a lack of sufficient keywords for the web service 40. In these cases, the trained, learned banner embeddings 134 will identify those semantic relationships and hidden meanings behind the web service banners/attributes 38/74 and HTTP/S responses. The CPE prediction service 30 may, if desired, reduce the dimensionality of these embeddings/vectors 134/136 in order to more easily feed them into the clustering algorithm or service. The CPE prediction service 30 thus novelly uses the custom learned banner embeddings 134 for CPE identification.

The CPE prediction service 30 may thus specifically train the AI/ML model 44. The CPE prediction service 30 creates the banner tokens 132 and the learned banner embeddings 134 using the web service banners/attributes 38/74 and HTTP/S responses. The CPE prediction service 30 specifically trains the AI/ML model 44 using the banner tokens 132 and/or the learned banner embeddings 134. The AI/ML model 44, and thus the CPE prediction service 30, is/are targeted and specialized to interpret the semantic content of the web service banners/attributes 38/74 and HTTP/S responses. The CPE prediction service 30 creates the banner tokens 132 and the learned banner embeddings 134 from scratch. The AI/ML model 44, and thus the CPE prediction service 30, learns the banner embeddings 134 to where it's only specialized on these banner embeddings 134. The AI/ML model 44 thus differs from a conventional large language model (or LLM). A conventional LLM is pre-trained using a huge corpus of materials having a wide variety of subject matter. The AI/ML model 44, in contradistinction, may be specifically and exclusively trained using the web service banners/attributes 38/74 and HTTP/S requests/responses scraped from the banner grabbing (as explained with reference to FIG. 12). Because the banner tokens 132 and the learned banner embeddings 134 are generated using only the web service banners/attributes 38/74 and other HTTP/S requests/responses, the CPE prediction service 30 creates a more specialized, targeted solution to the problem of CPE identification.

Figure 16:
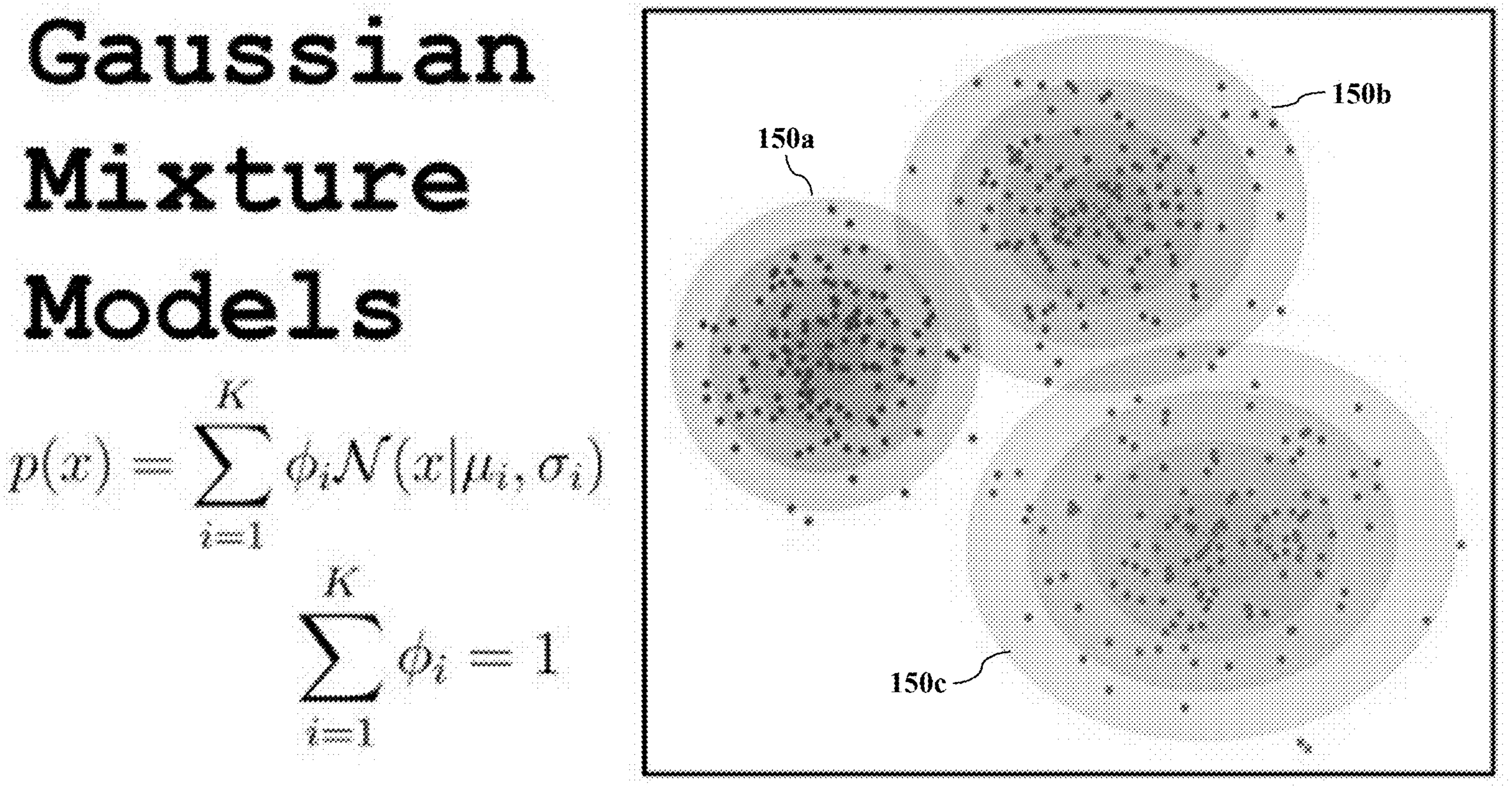

FIG. 16 illustrates more examples of the banner clusters 150. Once the CPE prediction service 30 creates the learned banner embeddings 134 (using the web service banners/attributes 38/74), the learned banner embeddings 134 may be grouped into the banner clusters 150. Because the learned banner embeddings 134 may be represented as the banner vectors 136, each learned banner embedding 134 is a vector of weights that represents each word in the web service banner/attribute 38/74. Because the AI/ML model 44 is trained on the underlying web service banners/attributes 38/74, words with similar meanings will typically have similar vector representations as each other. So, after the CPE prediction service 30 creates the learned banner embeddings 134, the CPE prediction service 30 may feed the learned banner embeddings 134 into a clustering algorithm or service that groups similar web services 40 together.

While other clustering schemes may be used, protype testing used soft clustering techniques. Because there may be a one-to-many relationship of web services 40 to CPEs, the protype testing implemented soft clustering. Soft clustering is a form of clustering where a datapoint can belong to multiple clusters. Prototype testing, for example, used expectation maximization of a Gaussian Mixture Model (GMM). This GMM process uses Bayesian statistics to predict probabilistic banner cluster assignments to each datapoint. The GMM is trained based off a similar iterative approach as k-means but it labels each cluster's distribution, defining its mean and variance. Means, variances, and probabilities are updated iteratively until convergence.

Banner clustering may be tuned. The number (e.g., n_components) of banner clusters 150 and the covariance type was tuned based on Bayesian Information Criterion (BIC). BIC measures data fit and complexity, penalizing for lower fit and higher complexity. A lower BIC indicates a favorable fit to the data with minimal complexity. Prototype testing used grid search cross-validation to select the optimal n_components (N) and covariance type based on the lowest mean BIC score. This resulted in n_components=250 and covariance_type='diag' according to $$BIC = -2\log(\hat{L}) + \log(N)d$$

where L is the maximized value of the likelihood function.

Thresholds may also be selected. Threshold selection was first determined using the predicted probability of each point belonging to each banner cluster 150. Given the soft assignments, this was readily available. After selecting a threshold, the prototype experiments resulted in a 1-to-1 relationship for all cluster assignments. This 1-to-1 relationship, though, would likely not hold true for all web services. That is, due to the one-to-many relationship, there could be multiple cluster assignment probabilities that are above the predefined threshold for a given web service. The next step of threshold location involved looking at the graphical distance (e.g., (x, y, z) or (r, θ, ϕ)) between cluster assignments and cluster centers (e.g., centroids). This distance metric allowed for a more flexible threshold with objectively better clustering results on the labeled data. Furthermore, prototype testing used silhouette coefficienting to filter-out highly overlapping banner clusters 150. In the full POC, we'll be able to address these concerns either in a post hoc manual way or in the clustering algorithm/model itself.

Figure 18:
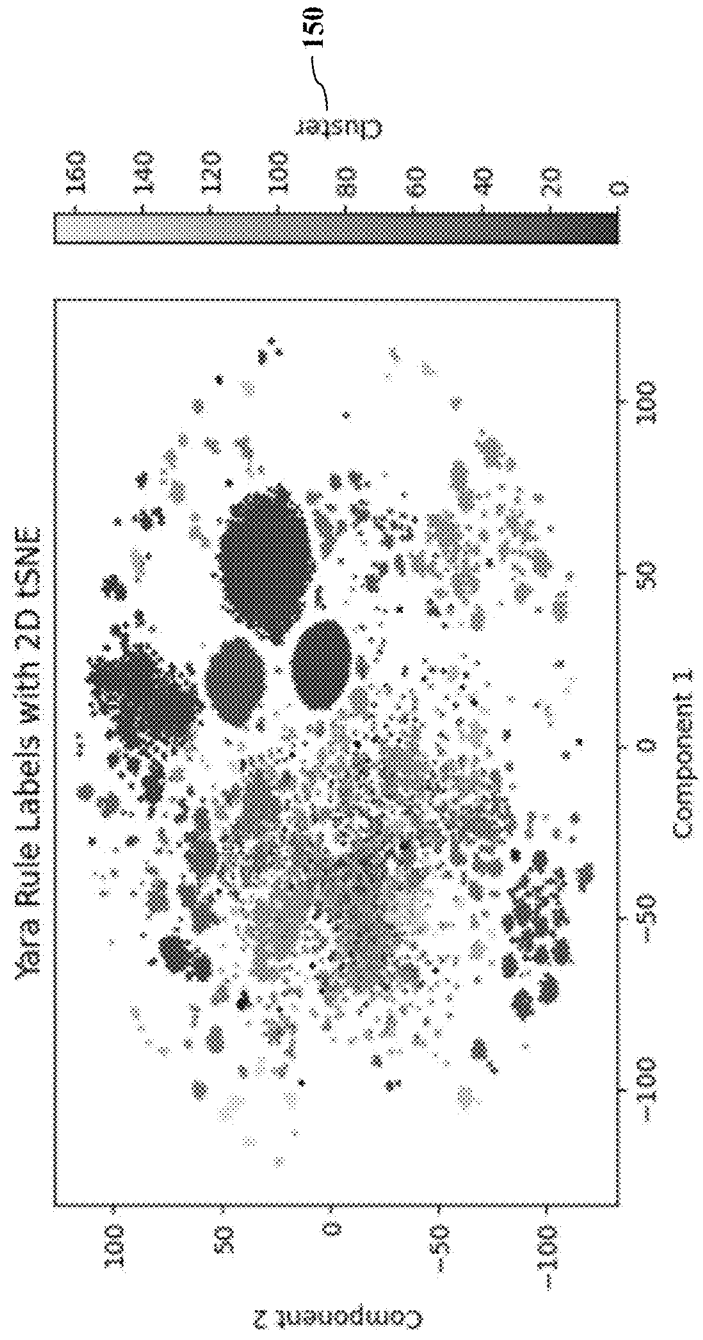
Figure 19:
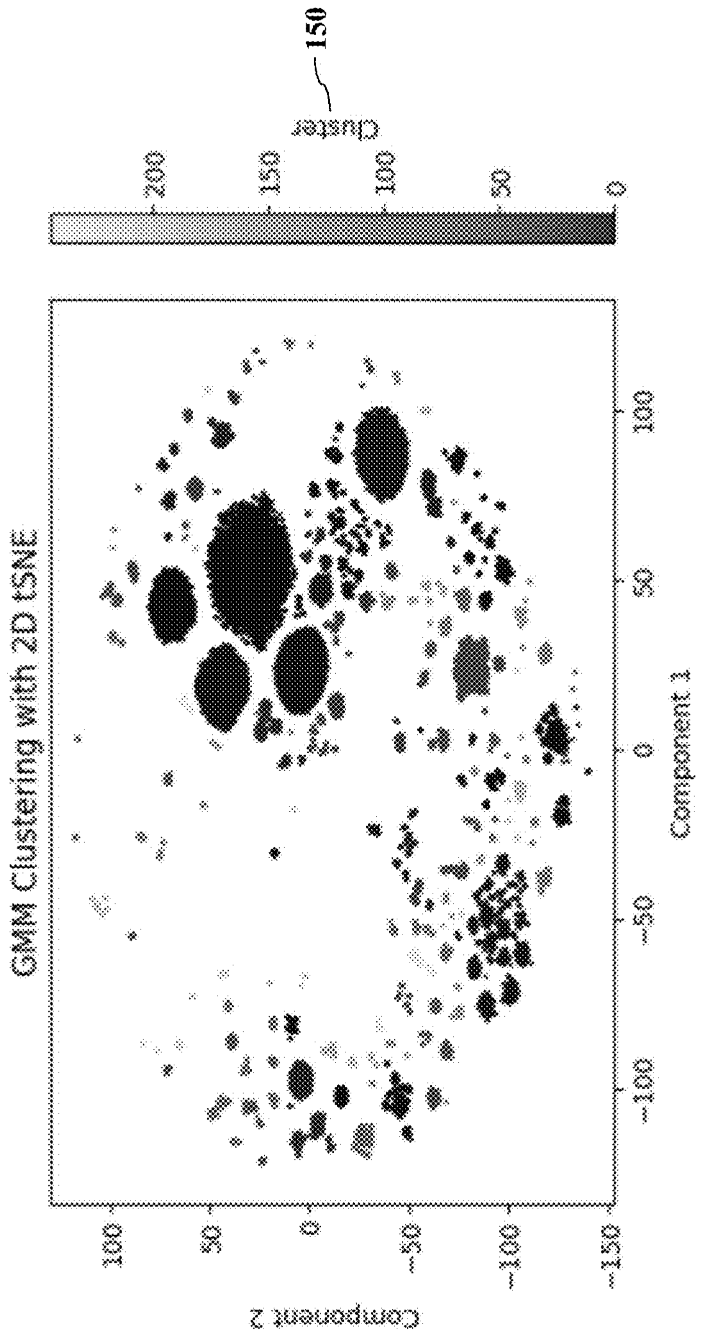

FIGS. 17-19 illustrate examples of evaluation and test results. The inventors have access to a large amount of the labeled CPE data 34 due to YARA rule predictions. Yara rule predictions are presumed to be of high precision for the purpose of quick evaluation, tuning, and threshold adjustments. In order to evaluate cluster assignments, the web services 40 were filtered to only those with predicted YARA rule CPEs (~60% of services) and several metrics were collected.

A homogeneity score, for example, may be used. Homogeneity measures the degree to which the banner clusters 150 only contain data points which are members of a single class. In the case of YARA-labeled CPEs, a perfectly homogenous banner cluster 150 may only contain one (1) YARA CPE list (such as "\['f5:nginx'\]"). The homogeneity score may thus be the best metric, as it indicates less false positives and randomness in cluster labeling. Because the evaluation values precision more than recall, it's perhaps important that cluster predictions generally belong to just a single class.

A completeness score may be used. Completeness measures the degree to which all members of a class are assigned to the same banner cluster 150. So, a perfectly complete banner cluster 150 would be, for example, all "\['f5:nginx'\]" web services 40 belonging to a single cluster. The completeness score, however, may be less important in the context of CPE identification/prediction, as precision is favored over recall, especially with already known CPEs (e.g. YARA-labeled CPEs). Also, in the context of the one-to-many relationship of web services 40 to CPEs, sometimes it makes sense for web services 40 with CPEs (such as "f5:nginx") to belong to different banner clusters 150, perhaps depending on what other CPEs are also present on that web service 40 and also depending on other confounding factors (such as the operating system, vendor-specific HTML responses, and other factors). For these reasons, then, completeness is measured at both the individual CPE level and the CPE list level. with CPE lists being a better indicator. In the productionized CPE prediction, for example, it may be acceptable to label multiple banner clusters 150 with the same CPE, as long as confidence is acceptable for those banner clusters 150 that contain mostly members of a single, familiar class.

Measures of harmonics may also be used. A V-measure score, for example, is the harmonic mean between homogeneity and completeness.

FIGS. 17-19, for example, comparatively illustrates the test results. After tuning the AI/ML model 44 and various thresholds, the test results are impressive. The results on the YARA-labeled CPE data showed a high degree of homogeneity and, in-turn, precision. The prototype testing captured/predicted about half of the YARA-labeled web services 40 with a high degree of completeness as well. Notice how the GMM captures many of the same banner clusters 150 as YARA rules, eliminating hard-to-separate banner clusters 150 through threshold tuning, and capturing additional banner clusters 150 from the non-labeled banner data.

The banner clusters 150 may be descriptively labeled. Some banner clusters 150, for example, may be labeled as false negatives. YARA rule false negatives are cases in which YARA rules have an existing CPE rule that failed to identify that CPE for a given web service 40. In order to label these "False Negatives," the CPE prediction service 30 may calculate the proportion of web services 40 in that banner cluster 150 that have a YARA label. If it is a significant proportion (e.g., ≥15%), the CPE prediction service 30 may assume with reasonable confidence that web services 40 within that banner cluster 150 that have missing YARA labels should be given the majority label.

Some banner clusters 150, as more examples, may be labeled as Unknown Services. When most of the web services 40 within a banner cluster 150 have very few or no YARA labels, these banner clusters 150 may be manually labeled. The CPE prediction service 30, for example, may take a random sample of web services from that banner cluster 150 and have subject matter experts (or SMEs) label their CPEs. If the SMEs can reach a consensus agreement with statistical significance in the sample set on what to label that banner cluster 150, this banner cluster 150 will map to the agreed-upon CPE during inference.

Figure 20:
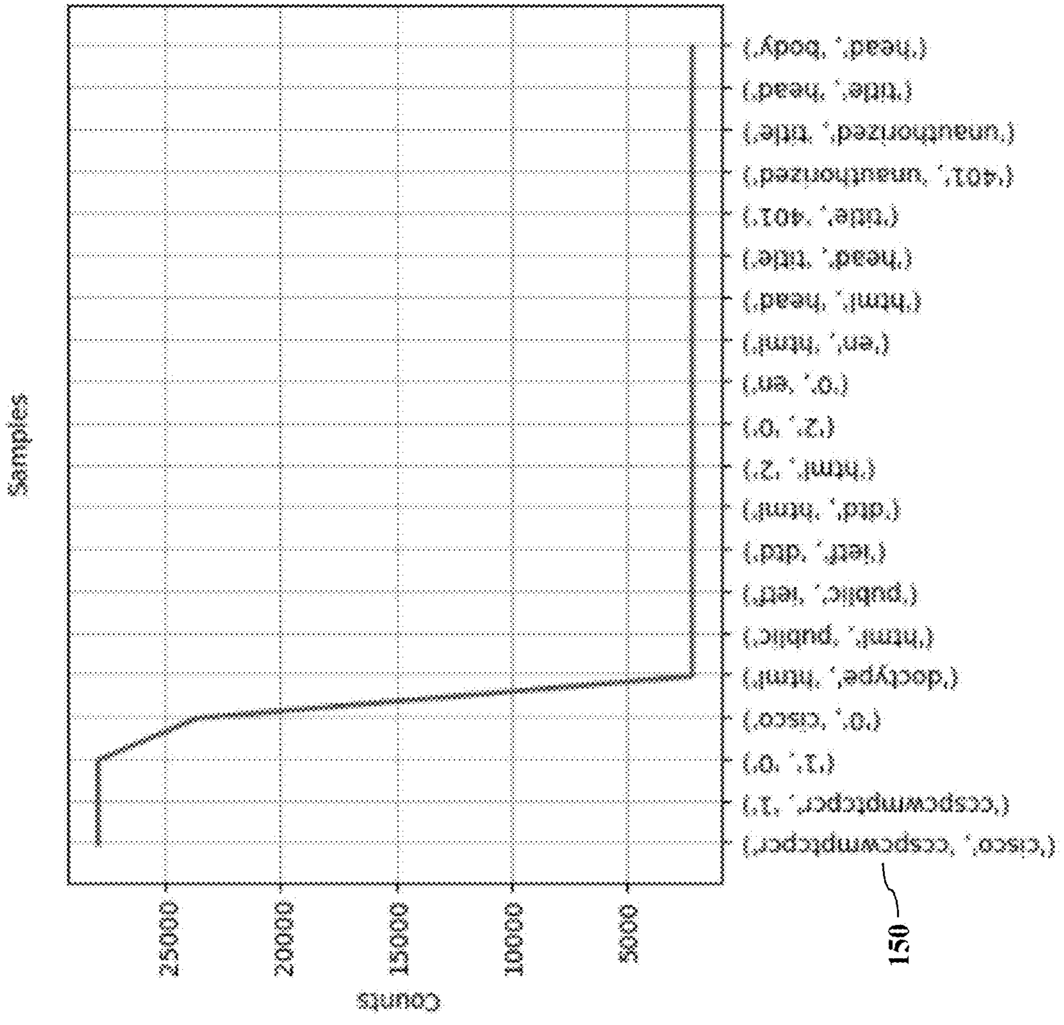
FIGS. 20-23 illustrate examples of clusteral interpretation.
Figure 21:
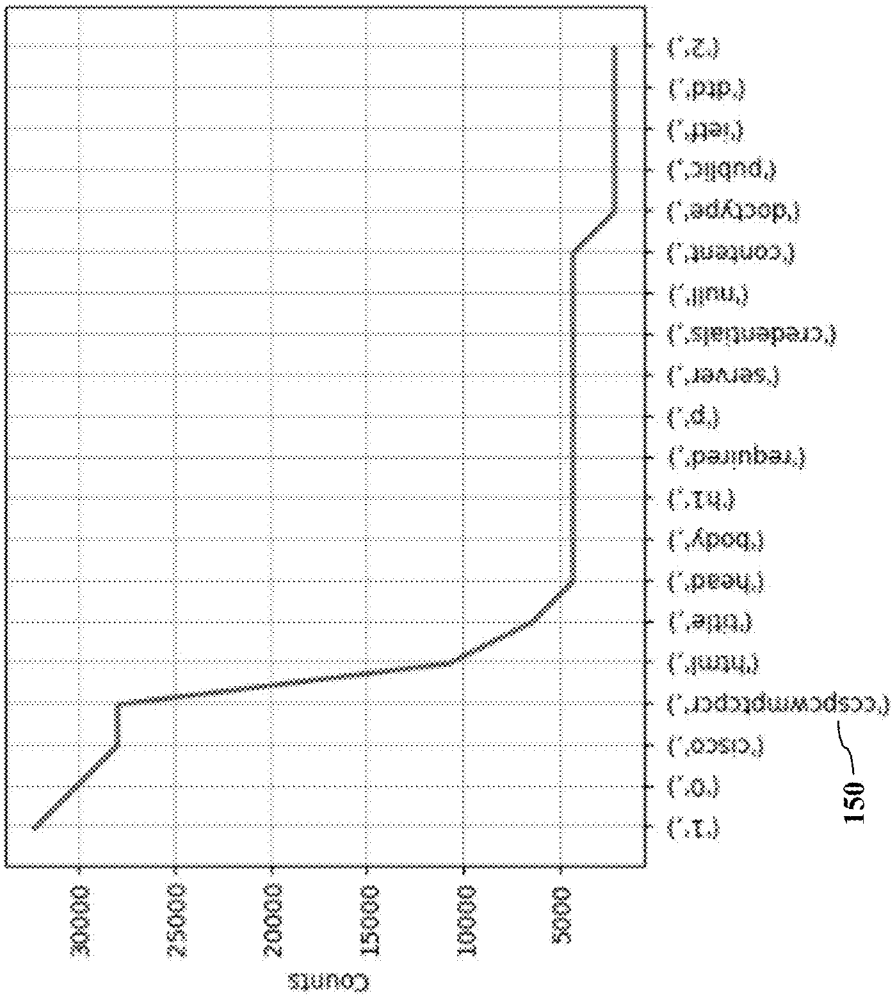
Figure 22:
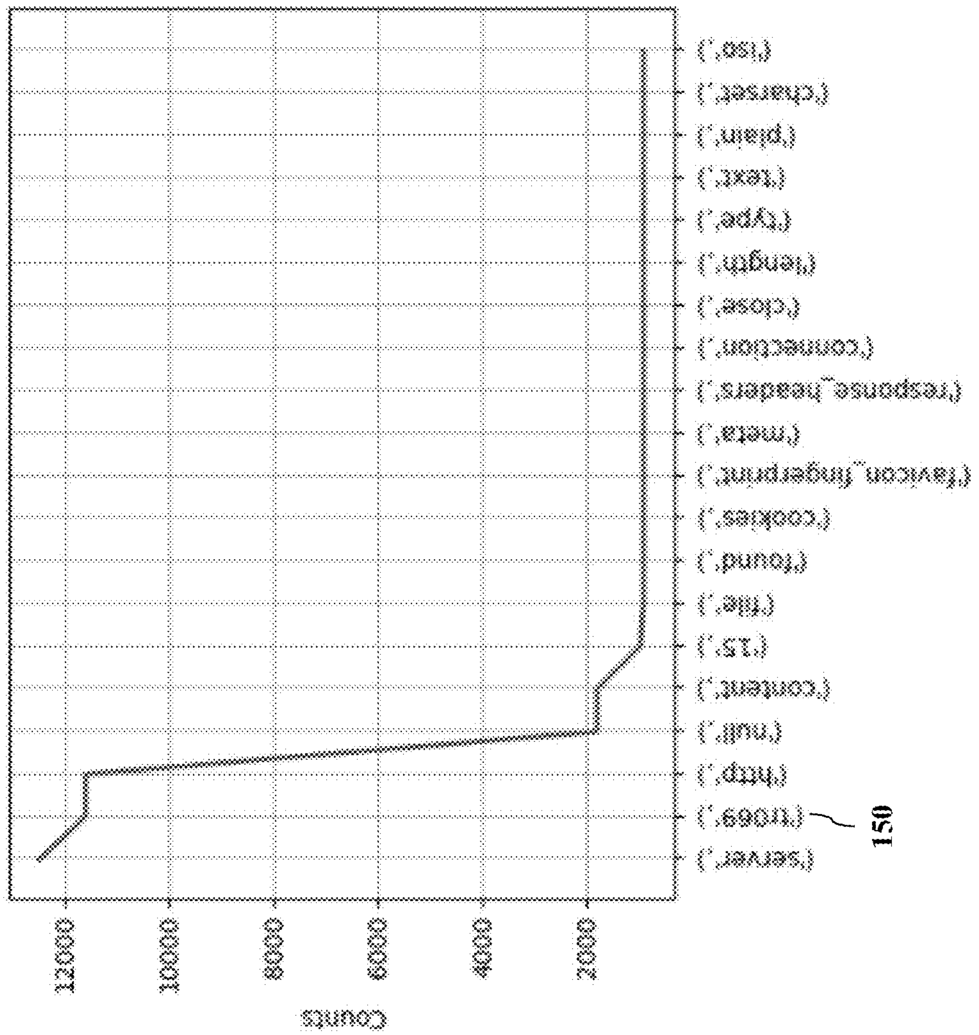
Figure 23:
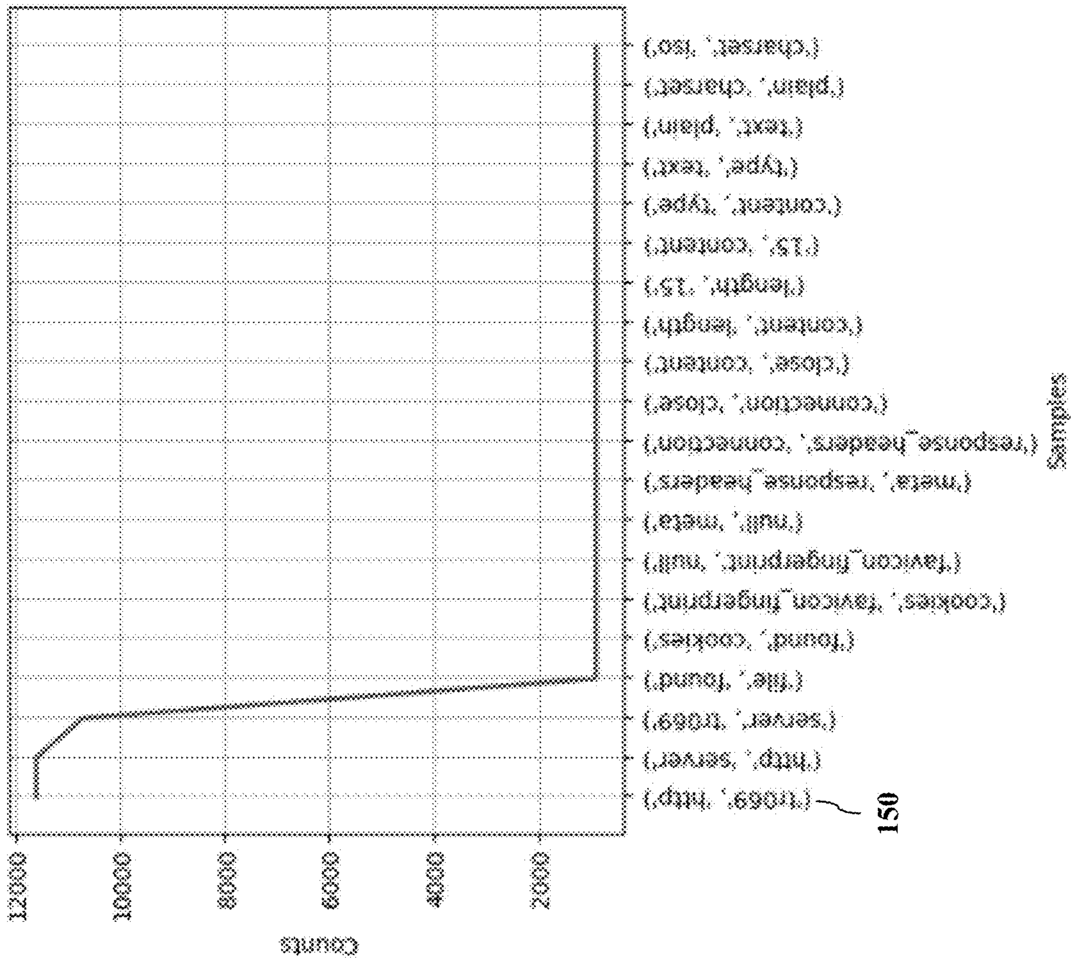

FIGS. 20-23 illustrate examples of clusteral interpretation. The CPE prediction service 30 may interpret the banner clusters 150 to further identify the predicted CPE product. The CPE prediction service 30 may use whatever interpretation scheme suits performance, cost, and other objectives. As FIGS. 20-23 illustrate, for example, some of the prototype testing used Inner-Cluster Word Frequency Distribution. That is, for each banner cluster 150, the CPE prediction service 30 generates a graphical representation or plot of the frequency of banner word and banner token occurrences, as well as their n-gram distribution, in order to give hints as to which CPEs they may represent. FIGS. 20-23 thus plot word frequencies and bi-gram frequencies. Notice, for example, that FIGS. 20-21 illustrate that one of the banner clusters 150 frequently mentions "ccspcwmptcpcr." Similarly, FIGS. 22-23 illustrate the prevalence of "server" and "tr069" in banner cluster 150.

Figure 24:
Figure 26:
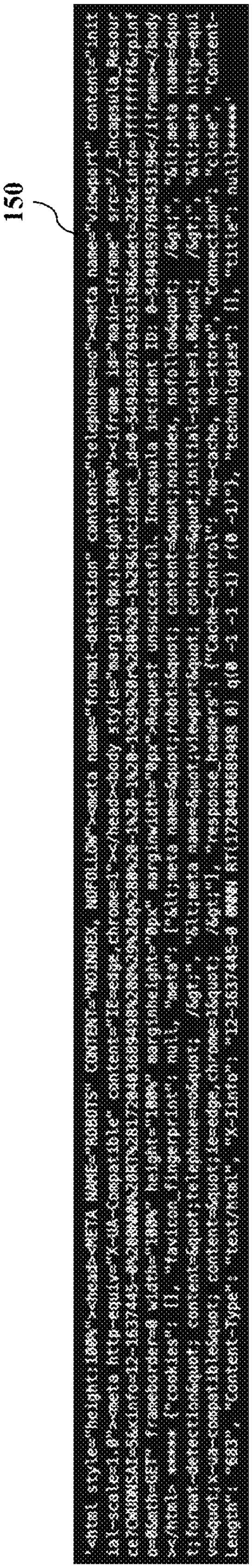

FIGS. 24-28 illustrate more examples of clusteral interpretation. Again, the CPE prediction service 30 may use whatever interpretation scheme that suits performance, cost, and other objectives. FIGS. 24-28, as more examples, illustrate centroidal banner clustering. Some of the prototype testing determined each banner cluster's centroidal text and used Local Interpretable Model-agnostic Explanations (or LIME) for interpretation. That is, the CPE prediction service 30 may first find the banner text that is closest to each banner cluster's centroid. For a quick interpretation of the banner clusters 150, the CPE prediction service 30 may determine the banner cluster's centroid and determine the banner text from the closest web service to that centroid. FIG. 24, for example, illustrates the banner cluster 150 that represents web services 40 running "FortiGuard Intrusion Prevention." FIG. 25 illustrates the banner cluster 150 that represents web services 40 running "tr069 http server." FIG. 26 illustrates the banner cluster 150 that represents web services 40 where the banner grabbing operation 122 (as explained with reference to FIG. 12) could not index and received a default HTTP/S response. While the HTTP/S response may not be a CPE, the HTTP/S response is still valuable feedback to have for future scans and for ignoring this banner cluster 150 in the CPE prediction pool.

FIGS. 27-28 illustrate added interpretation. Once the banner cluster's centroidal text is determined, the CPE prediction service 30 may LIME for added interpretation. The CPE prediction service 30, for example, may call or invoke a classifier service or algorithm that classifies each banner cluster 150. The CPE prediction service 30 may use whatever classification scheme that suits performance, cost, and other objectives. The prototype testing, for example, fit a proxy classifier on the banner clusters 150 to ensure high efficacy. In future evaluations, though, the prototype testing may refactor the banner clustering class and use a base classification model. In the initial prototype testing, though, the accuracy is near-perfect for the proxy classifier, so the proxy classifier avoids unnecessary work. Using the text closest to the banner cluster's centroid, the LIME is used to perturb variations of the text, by removing certain words. The instances are weighted based on cosine distance. LIME then fits a local surrogate model to the instance closest to the banner cluster centroid and thus reveals the coefficients for each banner word, with the highlighted banner words representing more important words in the CPE prediction.

FIG. 29 numerically illustrates the improved computer functioning. The targeted CPE prediction service 30, using banner clustering, is able to identify CPEs for 48% of previously unknown web services 40. This prototype result represents a 19.3% increase in web services 40 with identifiable CPEs. The banner-targeted CPE prediction service 30 thus cuts the CPE coverage gap in half, taking the percentage of web services 40 with at least 1 surface-identified CPE from 61.5% to 80.8%. The banner-targeted CPE prediction service 30, in particular, identifies popular, important CPEs and banner clusters 150 that captured much previously unknown signals (such as "tr069 http servers" and/or labeling HTTP/S service responses from failed scans due to NOINDEX restrictions). Moreover, banner clustering identifies false negatives and popular but missed CPEs, as well as novel CPEs that may have more semantic similarity than what would be discovered from simple keyword vectors alone. Simply put, by training and banner-prompting the AI/ML model 44 using the web service banners/attributes 38/74, the computer system 20 (such as the server 26) is programmed to quickly and precisely predict the CPE products. Because the CPE data 34 is associated with the web service 40, the CPE prediction application 56 may further determine that the corresponding common vulnerabilities and exposures (or CVE) data 36 also matches the web service 40 (as explained with reference to FIGS. 10-11). The CVE data 36, in other words, describes the known cybersecurity vulnerabilities, exposures, and other cyberthreats associated with the web service 40.

Figure 30:
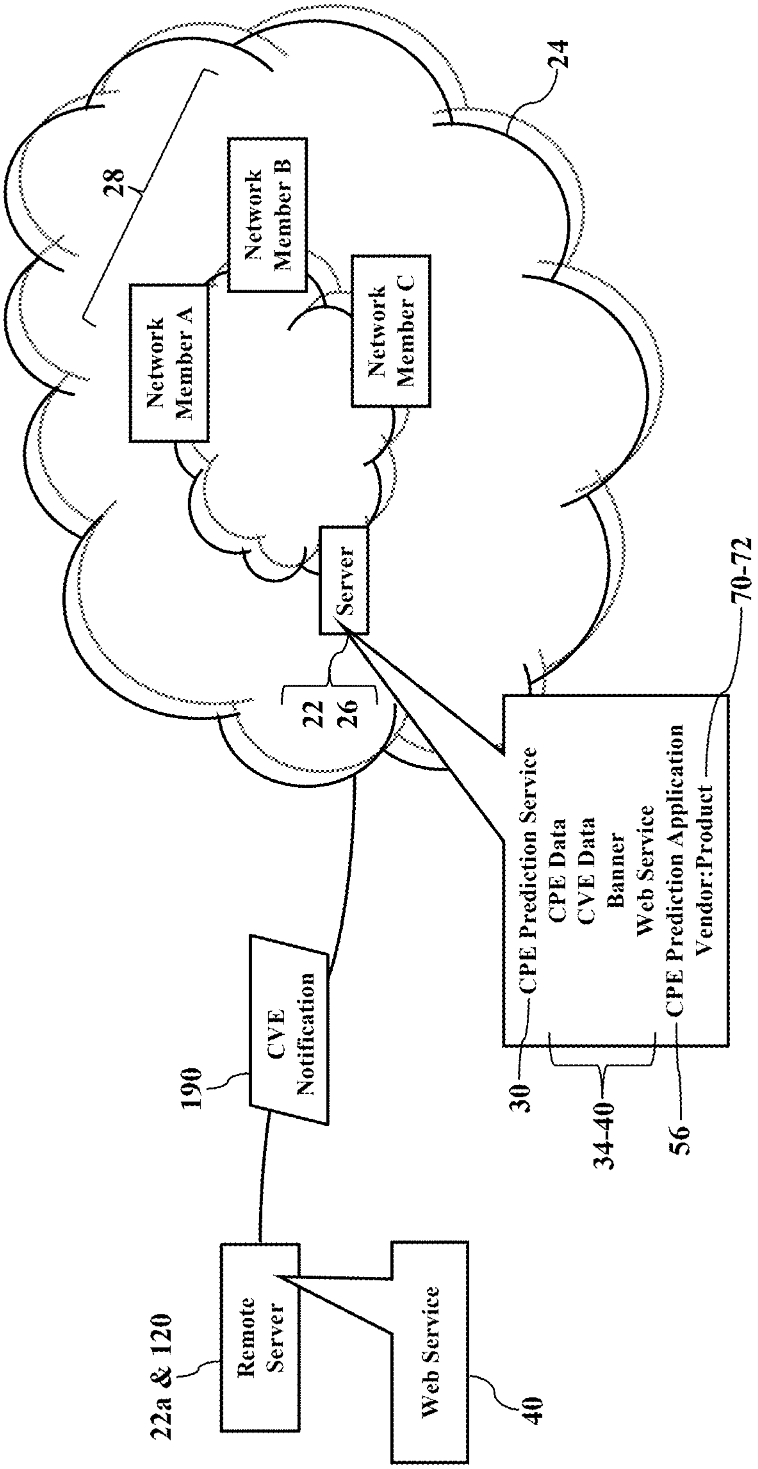
FIG. 30 illustrates examples of cybersecurity notifications.

FIG. 30 illustrates examples of cybersecurity notifications. Once the CPE products (e.g., the CPE data 34) are predicted and the CVE data 36 is determined, the CPE prediction service 30 may initiate cybersecurity remedial actions. Once the CPE/CVE data 34/36 is/are matched to the web service 40, the CPE prediction service 30 may implement operations that resolve the known cybersecurity vulnerabilities, exposures, and other cyberthreats associated with the web service 40. The CPE prediction service 30, for example, may cause the server 26 to generate and to send a CVE notification 190 to a network address (e.g., IP address) associated with the web service 40. FIG. 30, for simplicity, illustrates the CVE notification 190 routing to the remote server 22*a*/120 providing the web service 40. When the web service 40 and/or the remote server 22*a*/120 receives the CVE notification 190, the web service 40 and/or the remote server 22*a*/120 may be programmed to read the CVE notification 190 and to obtain the CVE data 36 describing the known cybersecurity vulnerabilities, exposures, and other cyberthreats associated with the web service 40. As a simple example, the CVE notification 190 may have electronic content identifying the vendor: product data fields 70-72 obtained from the predicted CPE data 34. The CVE notification 190 may further have electronic content identifying cybersecurity vulnerabilities, exposures, and other CVE data 36 associated with the vendor: product data fields 70-72. Simply put, the CVE notification 190 alerts the web service 40 that some portion of its software programming/services are out-of-date and/or otherwise vulnerable to cybersecurity threats. The web service 40 and/or the remote server 22*a*/120 may thus initiate software updates, patches, and other remedial operations that resolve the cyberthreats. The CPE prediction service 30 may thus alert web services 40 and servers 22*a*/120 to the CVE data 36 that improves computer functioning.

The CPE prediction service 30 thus again improves computer functioning. As users, customers, and organizations scale their networks, their product/computer exposure becomes increasingly difficult to monitor. Unknown, Internet-facing exposed assets leave severe blind spots for IT management. Most of these assets go unrecognized, and software products/services are riddled with unpatched, vulnerable programming. Threat actors are often motivated to take advantage of these vulnerable assets. The CPE prediction service 30, though, allows users, customers, and organizations to understand which CPEs are running on which assets. The CPE prediction service 30 reveals blind spots, from understanding CVE exposure to identifying products affected by Zero-Day vulnerabilities. Some conventional, rules-based schemes identify popular/prominent products, but it's impractical to implement rules for a wide variety of products and services. Indeed, many older/niche products are equally as prominent, revealing a long-tail where a substantial number of services are still represented by a large volume of less popular products. Due to the sheer volume of unique products in the wild, it's impractical to cover all products using rules-based methods.

The CPE prediction service 30, however, automatically monitors product exposure using the elegant banner-prompted AI/ML model 44. The CPE prediction service 30 uses the banner-prompted AI/ML model 44 to accurately predict and label CPE products. The CPE prediction service 30 specially trains the AI/ML model 44 using the web service banners/attributes 38/74 (as previously explained). The CPE prediction service 30 thus automatically identifies and matches CPEs across web services 40 scanned through external surface methods (such as publicly facing Internet ports). The CPE prediction service 30 pulls the CPE data 34 from any central vulnerabilities database (such as the vulnerability system 110) as well as the service banners 38 and attributes 74 from the external surface scans. The banners 38 and attributes 74 refer to text banners from banner grabbing and HTML responses from HTTP/S requests (such as the banner grabbing operation 122). The CPE prediction service 30 thus represents an AI/ML and clustering framework of identifying CPEs for given web services 40.

Computer functioning is further improved. The CPE prediction service 30 incorporates AI/ML to match CPEs based on the specialized banner embeddings 134 and internet scans. The CPE prediction service 30 maps scan responses to vector space, learns from the underlying data distributions, and predicts vulnerable computers to solve a known security challenge. The CPE prediction service 30, in particular, provides a CPE identification framework which works at scale and matches a substantial number of CPEs, perhaps even all, that requires little, if any, manual manpower. The CPE prediction service 30 uses passive scanning to identify more CPEs than active scanning in a less intrusive and much quicker manner. The CPE prediction service 30 uses the banner embeddings 134 to understand the banner tokens 132 within the global and local context of web service scans. The CPE prediction service 30 not only uses the service banners 38, but the CPE prediction service 30 may also harvest and use HTML response banners. The CPE prediction service 30 uses the banner 38 as an entirely new data source to find CPE matches both within banners 38 and HTML responses.

Computer functioning is further improved. The CPE prediction service 30 matches the CPE data 34 to the web service 40 using greatly reduced hardware (e.g., processor and memory) and network resources. By predicting matches between the CPE data 34 and the web service 40, the CPE prediction service 30 uses less processor cycles and memory bytes than conventional rules-based schemes. Moreover, by more accurately predicting matches the CPE data 34 to the web service 40, cybersecurity threats are more quickly determined and more quickly resolved/patched. Simply put, substantial computer resources may be reduced and reallocated, and substantial electrical power is concomitantly conserved.

Figure 31:
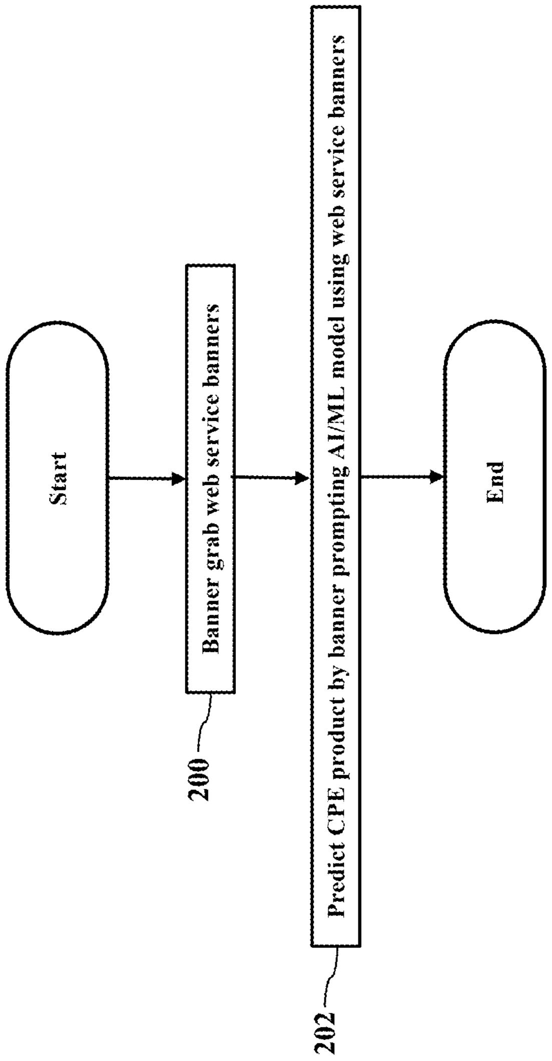
FIGS. 31-33 illustrate examples of methods or operations that predict common platform enumeration (CPE) products.

FIG. 31 illustrates examples of methods or operations that predict the common platform enumeration (CPE) product. The computer system 22 banner grabs the web service banner 38 (Block 200). The computer system 22 predicts the CPE product by banner prompting the AI/ML model 44 using the web service banner 38 (Block 202).

Figure 32:
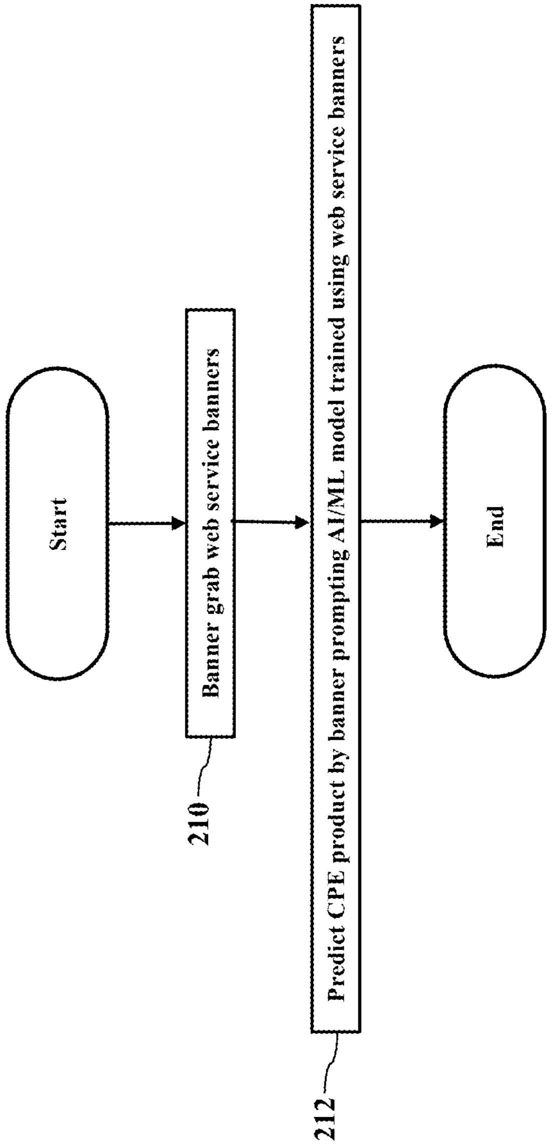

FIG. 32 illustrates more examples of methods or operations that predict the common platform enumeration (CPE) product. The computer system 22 banner grabs the web service banner 38 (Block 210). The computer system 22 predicts the CPE product by banner prompting the AI/ML model 44 trained using the web service banners 38 (Block 212).

Figure 33:
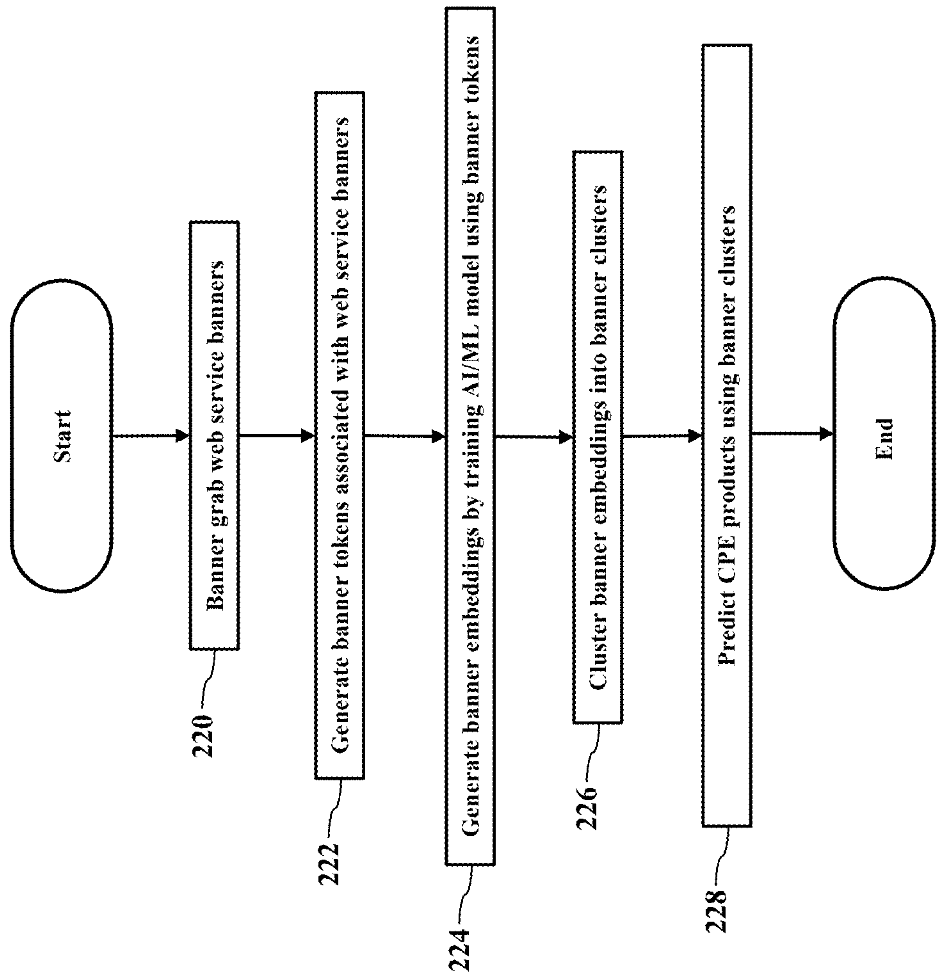

FIG. 33 illustrates more examples of methods or operations that predict common platform enumeration (CPE) products. The web service banners 38 are banner grabbed (Block 220). The banner tokens 132 are generated (Block 222). The banner embeddings 134 are generated by training the AI/ML model 44 using the banner tokens 132 (Block 224). The banner embeddings 134 are clustered into the banner clusters 150 using a clustering algorithm (Block 226). The CPE products are predicted using the banner clusters 150 (Block 228).

Figure 34:
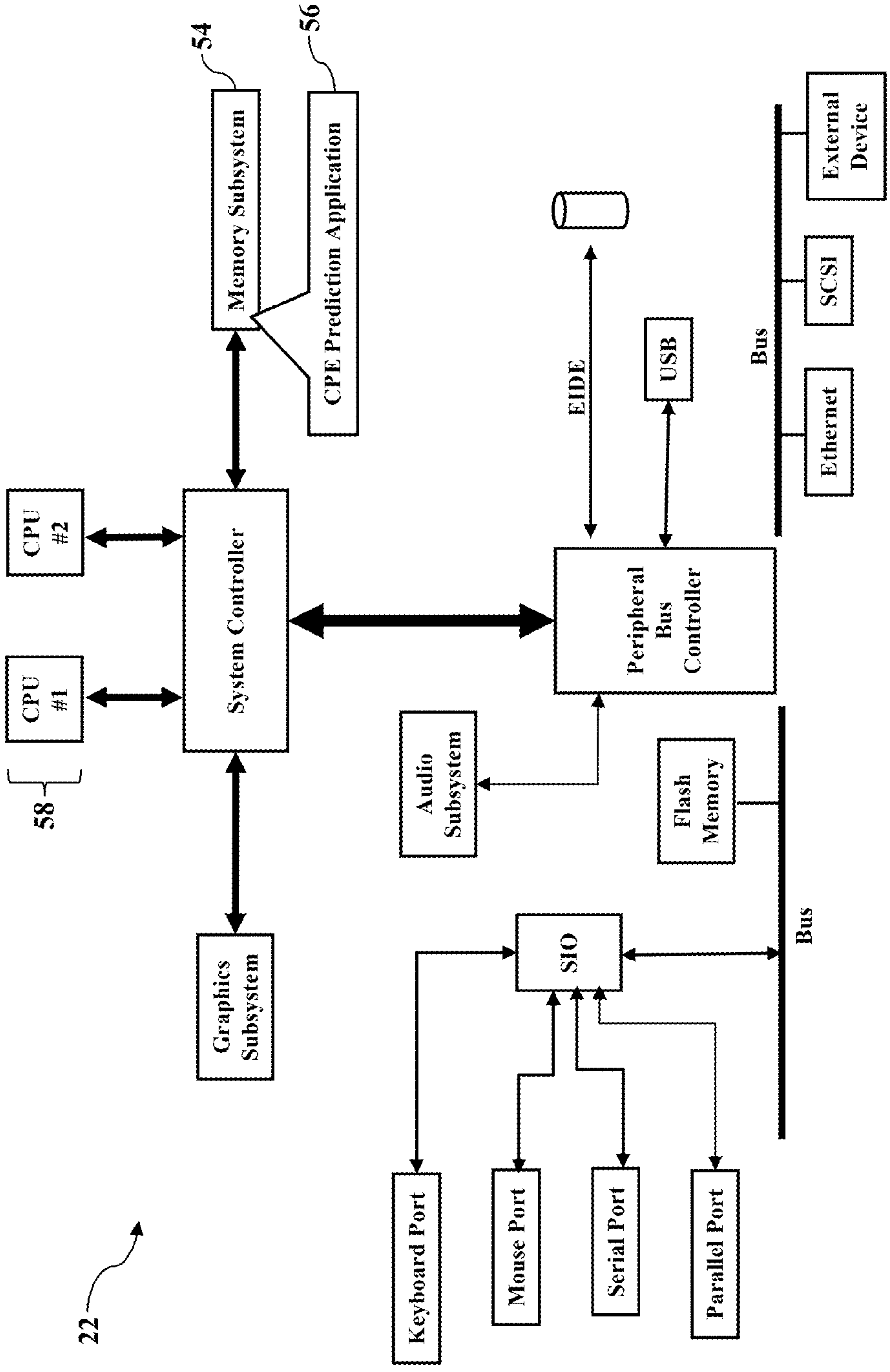
FIG. 34 illustrates a more detailed example of the operating environment.

FIG. 34 illustrates a more detailed example of the operating environment. FIG. 34 is a more detailed block diagram illustrating the computer system 22. The cybersecurity CPE prediction application 56 is stored in the memory subsystem or device 54. One or more of the hardware processors 58 communicate with the memory subsystem or device 54 and execute the cybersecurity CPE prediction application 56. Examples of the memory subsystem or device 54 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 22 may have any embodiment. This disclosure mostly discusses the computer system 22 as the server 26 and the remote server 120. The CPE prediction service 30, however, may be easily adapted to mobile computing, wherein the computer system 22 may be a smartphone, laptop or desktop computer, a switch/router, a tablet computer, or a smartwatch. The CPE prediction service 30 may also be easily adapted to other embodiments of smart devices, such as a television, an audio device, a remote control, and a recorder. The CPE prediction service 30 may also be easily adapted to still more smart appliances, such as washers, dryers, and refrigerators. Indeed, as cars, trucks, and other vehicles grow in electronic usage and in processing power, the CPE prediction service 30 may be easily incorporated into any vehicular controller.

The above examples of the CPE prediction service 30 may be applied regardless of communications networking technology and networking environment. The CPE prediction service 30 may be easily adapted to stationary or mobile devices having wide-area networking (e.g., 4G/LTE/5G/6G cellular), wireless local area networking (WI-FI®), near field, and/or BLUETOOTH® capability. The CPE prediction service 30 may be applied to stationary or mobile devices utilizing any portion of the electromagnetic spectrum and any signaling standard (such as the IEEE 802 family of standards, GSM/CDMA/TDMA or any cellular standard, and/or the ISM band). The CPE prediction service 30, however, may be applied to any processor-controlled device operating in the radio-frequency domain and/or the Internet Protocol (IP) domain. The CPE prediction service 30 may be applied to any processor-controlled device utilizing a distributed computing network, such as the Internet (sometimes alternatively known as the "World Wide Web"), an intranet, a local-area network (LAN), and/or a wide-area network (WAN). The CPE prediction service 30 may be applied to any processor-controlled device utilizing power line technologies, in which signals are communicated via electrical wiring. Indeed, the many examples may be applied regardless of physical componentry, physical configuration, or communications standard(s).

Operating environments may utilize any processing component, configuration, or system. For example, the CPE prediction service 30 may be easily adapted to execute by a desktop, mobile, or server central/graphical processing unit 58 or chipset offered by INTEL®, ADVANCED MICRO DEVICES®, ARM®, NVIDIA®, APPLE®, TAIWAN SEMICONDUCTOR MANUFACTURING®, QUALCOMM®, or other manufacturer. The computer system 22 may even use multiple central CPUs/GPUs/cores or chipsets, which could include distributed processors or parallel processors in a single machine or multiple machines. The CPUs/GPUs/cores or chipsets can be used in supporting a virtual processing environment. The CPUs/GPUs/cores or chipsets could include a state machine or logic controller. When any of the CPUs/GPUs/cores or chipsets execute instructions to perform "operations," this could include the CPUs/GPUs/cores or chipsets performing the operations directly and/or facilitating, directing, or cooperating with another device or component to perform the operations.

The CPE prediction service 30 may use packetized communications. When the computer system 22 and the cloud computing environment 24 communicate, information may be collected, sent, and retrieved. The information may be formatted or generated as packets of data according to a packet protocol (such as the Internet Protocol). The packets of data contain bytes of data describing the contents, or payload, of a message. A header of each packet of data may be read or inspected and contain routing information identifying an origination address and/or a destination address.

The CPE prediction service 30 may utilize any signaling standard. The cloud computing environment 24 may mostly use wired networks to interconnect the network members 28. However, the cloud computing environment 24 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing environment 24 may also utilize other standards, such as the I.E.E.E. 802 family of standards, the Industrial, Scientific, and Medical band of the electromagnetic spectrum, BLUETOOTH®, low-power or near-field, and any other standard or value.

The CPE prediction service 30 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for predicting the CPE products by banner-prompting the AI/ML model 44, as the above paragraphs explain.

The diagrams, schematics, illustrations, and tables represent conceptual views or processes illustrating examples of CPE predicting by banner-prompting the AI/ML model 44. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that predicts a common platform enumeration (CPE), comprising:
- banner-grabbing web service banners; and
- predicting the CPE by banner-prompting an artificial intelligence (AI) model trained using semantic content learned from the web service banners.

2. The method of claim 1, further comprising training the AI model based on the web service banners.

3. The method of claim 1, further comprising training the AI model using a CPE data.

4. The method of claim 1, wherein the banner-prompting further comprises using attributes associated with the web service banners.

5. The method of claim 1, further comprising determining a banner cluster associated with the web service banners.

6. The method of claim 5, further comprising classifying the banner cluster.

7. The method of claim 5, further comprising interpreting the banner cluster using centroidal text and Local Interpretable Model-agnostic Explanations.

8. At least one computer system that predicts a common platform enumeration (CPE) product, comprising:
- at least one central processing unit; and
- at least one memory device storing instructions that, when executed by the at least one central processing unit, perform operations, the operations comprising:
  - banner-grabbing web service banners;
  - generating banner tokens representing the web service banners; and
  - predicting the CPE product by banner-prompting an artificial intelligence (AI) model trained using data representing the banner tokens.

9. The at least one computer system of claim 8, wherein the operations further comprise determining a model identifier associated with the CPE product.

10. The at least one computer system of claim 9, wherein the operations further comprise training the AI model using the banner tokens.

11. The at least one computer system of claim 9, wherein the operations further comprise generating banner embeddings using the banner tokens.

12. The at least one computer system of claim 8, wherein the operations further comprise generating banner embeddings associated with the web service banners.

13. The at least one computer system of claim 12, wherein the operations further comprise clustering the banner embeddings into banner clusters using a clustering algorithm.

14. The at least one computer system of claim 12, wherein the operations further comprise clustering the banner embeddings using the attributes associated with the web service banners.

15. The at least one computer system of claim 8, wherein the operations further comprise generating banner embeddings using attributes associated with the web service banners.

16. The at least one computer system of claim 8, wherein the operations further comprise determining a vendor associated with the CPE product.

17. A memory device storing instructions that, when executed by at least one central processing unit, perform operations that predict common platform enumeration (CPE) products, the operations comprising:
- banner-grabbing web service banners;
- generating banner tokens representing the web service banners;
- generating banner embeddings using an artificial intelligence (AI) model trained using the banner tokens representing the web service banners;
- clustering the banner embeddings into banner clusters; and
- predicting the CPE products using the banner clusters.

18. The memory device of claim 17, wherein the operations further comprise determining a vendor associated with each one of the CPE products.

19. The memory device of claim 17, wherein the operations further comprise classifying the banner clusters.

20. The memory device of claim 17, wherein the operations further comprise:
- identifying centroids associated with the banner clusters; and
- classifying the banner clusters based on the centroids.

* * * * *